United States Patent
Harrison et al.

(10) Patent No.: US 11,228,984 B2
(45) Date of Patent: Jan. 18, 2022

(54) SIGNALING OF FULL POWER UPLINK MIMO CAPABILITY

(71) Applicant: Telefonaktiebolaget LM Ericsson (publ), Stockholm (SE)

(72) Inventors: Robert Mark Harrison, Grapevine, TX (US); Andreas Nilsson, Gothenburg (SE); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/114,741

(22) Filed: Dec. 8, 2020

(65) Prior Publication Data

US 2021/0092687 A1 Mar. 25, 2021

Related U.S. Application Data

(63) Continuation of application No. PCT/EP2020/072600, filed on Aug. 12, 2020.
(Continued)

(51) Int. Cl.
*H04W 52/10* (2009.01)
*H04W 52/14* (2009.01)
(Continued)

(52) U.S. Cl.
CPC ....... *H04W 52/146* (2013.01); *H04L 25/0226* (2013.01); *H04W 52/16* (2013.01); *H04W 52/367* (2013.01)

(58) Field of Classification Search
CPC ... H04W 52/146; H04W 80/02; H04W 52/04; H04W 52/10; H04W 52/325;
(Continued)

(56) References Cited

U.S. PATENT DOCUMENTS

2018/0368083 A1 12/2018 Yang et al.
2020/0083939 A1* 3/2020 Park ..................... H04W 72/042

FOREIGN PATENT DOCUMENTS

WO WO2019193426 10/2019
WO WO2020075090 4/2020

OTHER PUBLICATIONS

"On UL full Tx power," CATT, R1-1900341—3GPP TSG RAN WG1 Ad-Hoc Meeting 1901, Taipei, Jan. 21-25, 2019, 10 pgs.
(Continued)

*Primary Examiner* — Tu X Nguyen
(74) *Attorney, Agent, or Firm* — Baker Botts L.L.P.

(57) ABSTRACT

According to some embodiments, a method performed by a wireless device for transmitting on a plurality of antennas comprises signaling, to a network node, a wireless device power transmission capability. The wireless device power transmission capability identifies a power ratio value of a plurality of power ratio values that the wireless device supports for transmission of a physical uplink channel. Each value of the plurality of power ratio values corresponds to a transmission power capability and to a number of antenna ports. A power ratio refers to a ratio relative to a maximum power the wireless device is rated to transmit. The method further comprises transmitting a physical uplink channel using the number of antenna ports with a power scaled at least by the power ratio value.

24 Claims, 12 Drawing Sheets

Related U.S. Application Data

(60) Provisional application No. 62/887,922, filed on Aug. 16, 2019.

(51) Int. Cl.
*H04L 25/02* (2006.01)
*H04W 52/16* (2009.01)
*H04W 52/36* (2009.01)

(58) Field of Classification Search
CPC . H04W 52/365; H04W 52/38; H04W 52/545; H04W 52/58
See application file for complete search history.

(56) References Cited

OTHER PUBLICATIONS

"View on full power UL transmission," R1-1904451—3GPP TSG RAN WG1 meeting #96bis, Xi'an, China, Apr. 8-12, 2019, 9 pgs.

* cited by examiner

US 11,228,984 B2

SIGNALING OF FULL POWER UPLINK MIMO CAPABILITY

PRIORITY

The present application is a continuation under 35 U.S.C. 111(a) of co-pending International Patent Application Serial No. PCT/EP2020/072600 filed Aug. 12, 2020 and entitled "SIGNALING OF FULL POWER UPLINK MIMO CAPABILITY" which claims priority to U.S. Provisional Patent Application No. 62/887,922 filed Aug. 16, 2019 both of which are hereby incorporated by reference in their entirety.

TECHNICAL FIELD

Embodiments of the present disclosure are directed to wireless communications and, more particularly, to minimizing signaling of full power uplink multiple-input multiple-output (MIMO) capability.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The next generation mobile wireless communication system (5G) new radio (NR) supports a diverse set of use cases and a diverse set of deployment scenarios. The latter includes deployment at both low frequencies (100s of MHz), similar to long term evolution (LTE) today, and very high frequencies (mm waves in the tens of GHz).

5G NR also supports multiple-antenna transmission and reception. When multiple-antenna techniques are used, it is generally desirable to provide as much implementation freedom as possible so that different devices can be optimized for different use cases, form factors, construction cost, etc. Therefore, multiple-antenna operation in NR and LTE is described in terms of antenna ports. An antenna port is defined such that the channel over which a symbol on the antenna port is conveyed can be inferred from the channel over which another symbol on the same antenna port is conveyed.

An antenna port in a multiple-antenna system can be formed by transmitting the same reference signal on multiple transmit chains. The received signal is a combination of the reference signal after it travels through each radio channel corresponding to each of the antennas of the transmit chains, as illustrated in FIG. 1. The combined signal appears as though it were transmitted by a single antenna with combined, or "effective", channel and is therefore described as a single "virtual" antenna. An example is illustrated in FIG. 1.

FIG. 1 is a block diagram illustrating antenna virtualization. The illustrated example includes two transmit antennas 12 and one receive antenna 14.

When transmitting on two antennas 12, there may be a difference in relative gain or phase. The difference in relative gain or phase is illustrated in FIG. 1 as the factor e, which can be expressed as a complex number $e=ge^{j\phi}$, where g is a positive real number representing gain and $\phi$ is a real number representing phase.

The effective channel may then be given by: $h_c = h_1 + eh_2$, where $h_1$ and $h_2$ are complex numbers identifying the channels to first antenna 12a and second antenna 12b, respectively. The channels $h_1$ and $h_2$ will vary according to the frequency on which they are measured in the presence of multipath, and therefore vary among resource elements of an LTE or NR signal. Similarly, e may vary across frequency, depending on the design of the user equipment (UE) transmit chains. Herein, channels are described as complex scalars, focusing on a single resource element for purposes of explanation.

If the factor e can be sufficiently well controlled, coherent transmission across the two transmit chains is possible, and precoding or beamforming techniques can be used. Such techniques often set e to increase the received power of the effective channel, where the effective channel power may be described as $p_c = |h_c|^2$. Because coherent transmission facilitates greater received power, it is possible to use power amplifiers with lower power capability than when using a single antenna.

For example, assuming that the magnitudes of the two channels to the two antennas are the same and e is selected such that received signal from the second antenna is in phase with the first, then the power is four times higher than if the transmission were only on the first antenna, that is: $|h_1 + eh_2|^2/|h_2|^2 = |2h_1|^2/|h_1|^2 = 4$. Therefore, it is possible to transmit on each transmit chain with half power when using coherent transmission and still obtain two times more power than single antenna transmission.

If the factor e cannot be sufficiently well controlled, coherent transmission across the two transmit chains is not possible, but non-coherent transmission may be used instead. For non-coherent transmission, precoded transmissions on the two antennas do not necessarily provide a power gain, and instead may actually destructively combine to reduce the total power. The power in the effective channel is $|h_1 + eh_2|^2 = |h_1|^2 - 2\text{Re}(h_1^* eh_2) + |eh_2|^2$. If the term $2\text{Re}(h_1^* eh_2) = |h_1|^2 + |h_2|^2$, then the received power is zero, while on the other hand if $-2\text{Re}(h_1^* eh_2) = |h_1|^2 + |h_2|^2$, then the power is doubled.

Assuming again that the power in each of the channels to the antennas is the same and that $|e|^2 = 1$, the power gain over single antenna transmission is $((2|h_1|^2 - 2\text{Re}\{h_1^* eh_2\})/|h_1|^2$, which has a minimum value of 0 and a maximum value of 4. Assuming the channels are uncorrelated, the ratio of the average power of the combined power to that of the first antenna is $E\{(2|h_1|^2 - 2\text{Re}(h_1^* eh_2))/|h_1|^2\} = (2|h_1|^2)/|h_1|^2 = 2$. Therefore, if each antenna transmits at half power, and the channels are uncorrelated and equal power, the total power can be the same as when a single antenna is used. On the other hand, if the antennas are correlated, the power could be greater than or less than a single antenna, depending on the relative phase set by e.

The result is that some, but not all, UE implementations can transmit on N transmit chains with N power amplifiers whose maximum power rating is $P_{max}/N$, where $P_{max}$ is the total power needed from the UE and that would need to be transmitted on a single transmit chain. UE implementations such as those with correlated antennas (for example those with Re$\{h_1^* eh_2\} \neq 0$), that transmit on multiple transmit chains may produce less combined power than $P_{max}$ and so may require one or more of the power amplifiers on its N transmit chains to have a maximum power rating greater than $P_{max}/N$.

Multiple-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

A core component in Release 15 NR is the support of MIMO antenna deployments and MIMO related techniques. NR supports uplink MIMO with at least four layer spatial multiplexing using at least four antenna ports with channel dependent precoding. The spatial multiplexing mode is intended for high data rates in favorable channel conditions. An illustration of the spatial multiplexing operation is provided in FIG. 2 where cyclic prefix orthogonal frequency division multiplexing (CP-OFDM) is used on the uplink.

FIG. 2 is a block diagram illustrating the transmission structure of precoded spatial multiplexing mode in NR. As illustrated, the information carrying symbol vectors is multiplied by an $N_T \times r$ precoder matrix W, which serves to distribute the transmit energy in a subspace of the $N_T$ (corresponding to $N_T$ antenna ports) dimensional vector space.

The precoder matrix is typically selected from a codebook of possible precoder matrices and is typically indicated by a transmit precoder matrix indicator (TPMI), which specifies a unique precoder matrix in the codebook for a given number of symbol streams. The r symbols in s each correspond to a layer, and r is referred to as the transmission rank. In this way, spatial multiplexing is achieved because multiple symbols can be transmitted simultaneously over the same time/frequency resource element (TFRE). The number of symbols r is typically adapted to suit the current channel properties.

The received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in what is referred to as channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W is to select the $W_k$ that maximizes the Frobenius norm of the hypothesized equivalent channel:

$$\max_k \left\| \hat{H}_n W_k \right\|_F^2$$

where $\hat{H}_n$ is a channel estimate, possibly derived from a sounding reference signal (SRS), $W_k$ is a hypothesized precoder matrix with index k, and $\hat{H}_n W_k$ is the hypothesized equivalent channel.

In closed-loop precoding for the NR uplink, the transmit reception point (TRP) transmits, based on channel measurements in the reverse link (uplink), TPMI to the UE that the UE should use on its uplink antennas. The gNodeB configures the UE to transmit a SRS according to the number of UE antennas it would like the UE to use for uplink transmission to enable the channel measurements. A single precoder that is supposed to cover a large bandwidth (wideband precoding) may be signaled.

Other information than TPMI is generally used to determine the uplink MIMO transmission state, such as SRS resource indicators (SRIs) as well as transmission rank indicator (TRIs). These parameters, as well as the modulation and coding state (MCS), and the uplink resources where the physical uplink shared channel (PUSCH) is to be transmitted, are also determined by channel measurements derived from SRS transmissions from the UE. The transmission rank, and thus the number of spatially multiplexed layers, is reflected in the number of columns of the precoder W. For efficient performance, selecting a transmission rank that matches the channel properties is important.

NR also supports non-codebook based transmission/precoding for PUSCH in addition to codebook based precoding. For non-codebook based transmission/precoding, a set of SRS resources are transmitted where each SRS resource corresponds to one SRS port precoded by a precoder selected by the UE. The gNB can then measure the transmitted SRS resources and feedback to the UE one or multiple SRS resource indication (SRI) to instruct the UE to perform PUSCH transmission using the precoders corresponding to the referred SRS resources. The rank in this case is determined from the number of SRIs fed back to the UE.

By configuring the UE with the higher layer parameter SRS-AssocCSIRS and with the higher layer parameter ulTxConfig set to 'NonCodebook', the UE may be configured with a non-zero power (NZP) CSI-RS to utilize reciprocity to create the precoders used for SRS and PUSCH transmission. Thus, by measuring on the specified CSI-RS, the UE is able to perform gNB transparent precoding based on reciprocity.

Another mode of operation is to instead let the UE choose the precoders such that each SRS resource corresponds to one UE antenna. Thus, in this case the SRS resource is transmitted from one UE antenna at a time and the SRIs would hence correspond to different antennas. Accordingly, by choosing the UE precoders like this the gNB is able to perform antenna selection at the UE by referring to the different SRIs which in turn correspond to different antennas.

To summarize, non-codebook based precoding includes both antenna selection and gNB transparent reciprocity based precoding.

NR also includes coherence capabilities. Release 15 NR defines UE capabilities for full coherence, partial coherence, and non-coherent transmission. These correspond to where all transmit chains, pairs of transmit chains, or none of the transmit chains have sufficiently well controlled relative phase for codebook based operation.

Full coherence, partial coherence, and non-coherent UE capabilities are identified according to the terminology of Third Generation Partnership Project (3GPP) technical specification (TS) 38.331 version 15.0.1 as 'fullAndPartialAndNonCoherent', 'partialCoherent', and 'nonCoherent', respectively. This terminology is used because a UE supporting fully coherent transmission is also capable of supporting partial and non-coherent transmission and because a UE supporting partially coherent transmission is also capable of supporting non-coherent transmission.

A UE can be configured to transmit using a subset of the uplink MIMO codebook that can be supported with its coherence capability. In 38.214 section 6.1.1, the UE can be configured with higher layer parameter ULCodebookSubset, which can have values 'fullAndPartialAndNonCoherent', 'partialAndNonCoherent', and 'nonCoherent', indicating that the UE uses subsets of a codebook that can be supported by UEs with fully coherent, partially coherent, and non-coherent transmit chains.

Sounding reference signals are used for a variety of purposes in LTE and are expected to serve even more purposes in NR. One primary use for SRS is for uplink channel state estimation, facilitating channel quality estimation to enable uplink link adaptation (including determination of which MCS state the UE should transmit with) and/or frequency-selective scheduling. In the context of uplink MIMO, SRS may also be used to determine precoders and a number of layers that will provide good uplink throughput and/or signal to interference plus noise ratio (SINR) when the UE uses them for transmission on its uplink antenna array. Additional uses include power control, uplink timing advance adjustment, beam management, and reciprocity-based downlink precoding.

Unlike LTE Release 14, at least some NR UEs may be capable of transmitting multiple SRS resources. This is similar conceptually to multiple CSI-RS resources on the downlink. An SRS resource comprises one or more antenna ports, and the UE may apply a beamformer and/or a precoder to the antenna ports within the SRS resource such that they are transmitted with the same effective antenna pattern. A primary motivation for defining multiple SRS resources in the UE is to support analog beamforming in the UE where a UE can transmit with a variety of beam patterns, but only one at a time. Such analog beamforming may have relatively high directivity, especially at the higher frequencies that can be supported by NR.

In NR, the SRS sequence is a UE-specifically configured Zadoff-Chu based sequence and an SRS resource consists of 1, 2 or 4 antenna ports. Another feature supported by NR is repetition of symbols within the resource with factor 1, 2 or 4. This means that the transmission may be extended to multiple orthogonal frequency division multiplexed (OFDM) symbols which is intended for improving the uplink coverage of the SRS. An SRS resource always spans 1, 2 or 4 adjacent OFDM symbols and all ports are mapped to each symbol of the resource. SRS resources are mapped within the last 6 OFDM symbols of an uplink slot. SRS resources are mapped on either every second or every fourth subcarrier, that is with comb levels either 2 or 4. SRS resources are configured in SRS resource sets which contain one or multiple SRS resources.

NR also includes uplink power control. Setting output power levels of transmitters (e.g., base stations in downlink and mobile stations in uplink) in mobile systems is commonly referred to as power control (PC). Objectives of power control include improved capacity, coverage, improved system robustness, and reduced power consumption.

In LTE, power control mechanisms can be categorized in to the groups (i) open-loop, (ii) closed-loop, and (iii) combined open- and closed-loop. These differ in what input is used to determine the transmit power. In the open-loop case, the transmitter measures a signal sent from the receiver, and sets its output power based on the measurement. In the closed-loop case, the receiver measures the signal from the transmitter, and based on the measurement sends a transmit power control (TPC) command to the transmitter, which then sets its transmit power accordingly. In a combined open- and closed-loop scheme, both inputs are used to set the transmit power.

In systems with multiple channels between the terminals and the base stations (e.g., traffic and control channels) different power control principles may be applied to the different channels. Using different principles yields more freedom in adapting the power control principle to the needs of individual channels. The drawback is increased complexity of maintaining several principles.

There currently exist certain challenges. For example, UEs are required to transmit at their rated power, but may do so in a variety of ways. UEs may use sufficiently large power amplifiers (PAs) such that each transmit chain can deliver the full power. Alternatively, UEs can virtualize their antennas, as described above, where multiple transmit chains transmit the same PUSCH layer to form an antenna port. The virtualization enables UEs to combine the power of their transmit chains, facilitating use of lower power PAs. Virtualization, however, can be more or less difficult to use depending on how correlated or coupled the antennas are in the transmit chains, and how similar their antenna patterns are.

In Release 15 NR and in LTE, the power that UEs are required to transmit may vary according to the rank and according to the precoder used. For example, some precoders that transmit on one port will be allowed to be transmitted at a power level $P_{cmax}/N$ when the UE is configured N SRS ports in uplink MIMO operation. On the other hand, these same UEs when configured for single antenna port operation are required to transmit at the rated power of $P_{cmax}$.

Therefore, one approach is to have one full power PA and the remaining PAs support $P_{cmax}/N_{TX}$, where $N_{TX}$ is the number of transmit chains in the UE, or equivalently in Release 15, the maximum number of SRS ports in an SRS resource supported by the UE. UEs that support virtualization may instead use PAs that are all less than the rated power, for example where all transmit chains have PAs that support $P_{cmax}/N_{TX}$. In this case, single antenna port operation requires that all Tx chains are virtualized together.

Still other UEs may not be able to virtualize all of their antennas, but can virtualize antenna subsets, for example pairs of antennas. In this case, such a UE could have transmit chains with maximum powers $2 \cdot P_{cmax}/N_{TX}$. The cost of PAs also varies according to how common the rated power is and according to the maximum power, operating band, etc. Therefore, the PA powers selected can vary for a wide variety of reasons.

It is therefore desirable to support many different PA power combinations in NR specifications, delivering as much power as possible for the given configuration. It is in theory possible to specify a large list enumerating the exact power of each transmit chain used by the UE. However, identifying a large number of combinations requires a large amount of signaling overhead, especially if the UE must report the power capability for each combination of uplink carriers it supports in each band that it supports. Furthermore, disclosing the exact power level of each transmit chain in the UE is undesirable, because this may limit which transmit chains the UE may virtualize, and moreover forces the UE to use particular power amplifier configurations.

Therefore, one problem is how to indicate UE uplink MIMO power capability using a minimal amount of signaling while maximizing UE implementation freedom. One approach is to identify TPMIs for which full power is supported, as shown in Table 1.

TABLE 1

| | Rank-1 | Rank-2 | Rank-3 |
|---|---|---|---|
| Codebook subset of nonCoherent with 2Tx | | — | — |
| Codebook subset of nonCoherent with 4Tx | | | |
| Codebook subset of 'partialAndNonCoherent' Or 'fullyAndPartialAndNon Coherent' with 4Tx | | | |

As one example, 10 bits is required according to this proposal, for example, when the UE indicates if it can support full power for each of the 10 precoders in the third row of Table 1 "Codebook subset of 'partialAndNonCoherent' or 'fullyAndPartialAndNonCoherent' with 4Tx", where one bit corresponds to each precoder. Given that UE capability for uplink MIMO is specified per band per band combination in Release 15, 10 bits is relatively large.

A further drawback with the proposal is that it indicates specific antenna ports that support full power. The rank 1 precoders have a single unity value which implies full power on a specific antenna port.

Another drawback of the proposal is that UEs only identify if a particular precoder transmits the rated power or not. If a non-coherent UE with 4 transmit chains indicates support for a rank 2 precoder with full power, then two transmit chains may be expected to be capable of transmitting with at least half power on their respective ports. However, if the same UE transmits rank 1, it is unclear which antenna ports, if any, would be able to transmit at half power, rather than the 1/4 power expected from Release 15. In other words, the solution described above indicates if a TPMI can transmit with full power or not, but does not indicate if a TPMI can transmit with other power levels, for example, half power or a quarter of the power.

SUMMARY

Based on the description above, certain challenges currently exist with transmitting on a plurality of antennas. Certain aspects of the present disclosure and their embodiments may provide solutions to these or other challenges. For example, particular embodiments include power scaling mechanisms to support full power uplink multiple-input multiple-output (MIMO) transmission for user equipment (UEs) only capable of non-coherent operation. The supported power scaling values are signaled via UE capability either as ratios in a power scaling equation, or as a subset of transmit precoder matrix indicators (TPMIs) supporting full power operation, or a combination of a power scaling value and the TPMI that supports the power scaling value.

Some embodiments include transmission power capability using power ratios supported by the UE. According to some embodiments, a method performed by a wireless device for transmitting on a plurality of antennas comprises signaling, to a network node, a wireless device power transmission capability. The wireless device power transmission capability identifies a power ratio value of a plurality of power ratio values that the wireless device supports for transmission of a physical uplink channel. Each value of the plurality of power ratio values corresponds to a transmission power capability and to a number of antenna ports. A power ratio refers to a ratio relative to a maximum power the wireless device is rated to transmit. The method further comprises transmitting a physical uplink channel using the number of antenna ports with a power scaled at least by the power ratio value.

Some embodiments use power scaling with a minimum function to not transmit above $P_{CMAX}$, and scales according to the number of sounding reference signal (SRS) ports associated with the power ratio. In particular embodiments, the method further comprises scaling a transmission power for the physical uplink channel based on the number of antenna ports associated with the power ratio value. The scaling may be limited so that the scaled transmission power does not exceed the maximum value the wireless device is rated to transmit. The scaling may be by a factor $$\delta(k) = \min\left(1, \frac{N_{nz} \cdot \Delta(k)}{N_{srs}}\right),$$

wherein $\Delta(k)$ is a power ratio value and a real positive real number, $N_{nz}$ is a number of antenna ports with non-zero transmission power used to transmit the physical uplink channel, and $N_{SRS}$ is a number of antenna ports and a number of sounding reference signal (SRS) ports in an SRS resource with index k configured to the wireless device.

In some embodiments, the power scaling capability identifies a power ratio associated with rank and TPMI. In particular embodiments, the transmission power capability identifies a plurality of power ratio values, each associated with a number of physical uplink channel layers, a precoder to be used to transmit the physical uplink channel, and the number of antenna ports. In some embodiments, power ratios are jointly encoded. The transmission power capability may identify a plurality of power ratio values, each associated with a different number of antenna ports. In some embodiments, power scaling is further associated with coherence capability of the UE. The transmission power capability may correspond to a codebook subset. The subset is identified as containing at least one of fully and partial and non-coherent precoders, partial and non-coherent precoders, and non-coherent precoders.

In some embodiments, a second power ratio may be associated with a TPMI. In particular embodiments, the transmission power capability further comprises a second power ratio of the plurality of power ratio values and a precoder that the wireless device may use for physical uplink channel transmission with the power scaled by the second power ratio and with the number of antenna ports.

In some embodiments, only a subset of TPMIs in TPMI capability signaling can support full power. A UE implementation can remap its PAs to match. Rel-15 or Rel-15-like scaling may be used for non-full power TPMIs. According to some embodiments, a method performed by a wireless device for transmitting on a plurality of antennas comprises receiving an indication of a precoder to be used to transmit a physical uplink channel. The precoder is one precoder of a set of precoders. Each precoder in the set of precoders is a matrix or vector comprising an equal number of non-zero elements. A first precoder in the set of precoders is able to be associated with a first power scaling value or a second power scaling value, and a second precoder in the set of precoders is only able to be associated with the second power scaling value. The method further comprises transmitting a layer i of an L layer physical uplink channel at a power $P_i$ according to the first or second power scaling value associated with the precoder.

In particular embodiments, the first power scaling value is $P_i=P/L$, where P is the total power to be used for physical uplink channel transmission, and the second power scaling value is $P_i=PR/L$, where $R=M/K$, M is a number of antenna ports with non-zero physical uplink channel transmission. K is one of: a maximum number of physical uplink channel layers supported by the wireless device, a number of antenna ports used in a codebook configured for the wireless device, a maximum rank configured to the wireless device, and a number of SRS ports configured to the wireless device for one or both of codebook and non-codebook based operation.

In some embodiments, all TPMIs in the full power TPMIs transmit on at least one same antenna port. In particular embodiments, each precoder in the set of precoders associated with the second power scaling value contains a non-zero magnitude element corresponding to an antenna port shared by the precoders associated with the second power scaling value.

In some embodiments, a UE maps strongest transmit chain to the same antenna port, and a weaker transmit chain to a different port. In particular embodiments, the method further comprises transmitting a first reference signal corresponding to the antenna port shared by the precoders associated with the second power scaling value using a power amplifier capable of transmitting at least at the maximum power the wireless device is rated to transmit, and transmitting a second reference signal corresponding to a second antenna port using a power amplifier capable of transmitting less than maximum power the wireless device is rated to transmit, wherein the second antenna port is different from the antenna port shared by the precoders associated with the second power scaling value.

According to some embodiments, a wireless device is capable of transmitting on a plurality of antennas. The wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

Certain embodiments may provide one or more of the following technical advantages. For example, in particular embodiments the transmission power capability signaling methods use a reduced amount of signaling overhead as compared to other approaches, as well as conveying more precise information of what transmission power the UE supports. Embodiments herein may also enable a UE to transmit higher power more often, because prior scaling mechanisms may overly restrict when UEs may transmit at higher powers.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
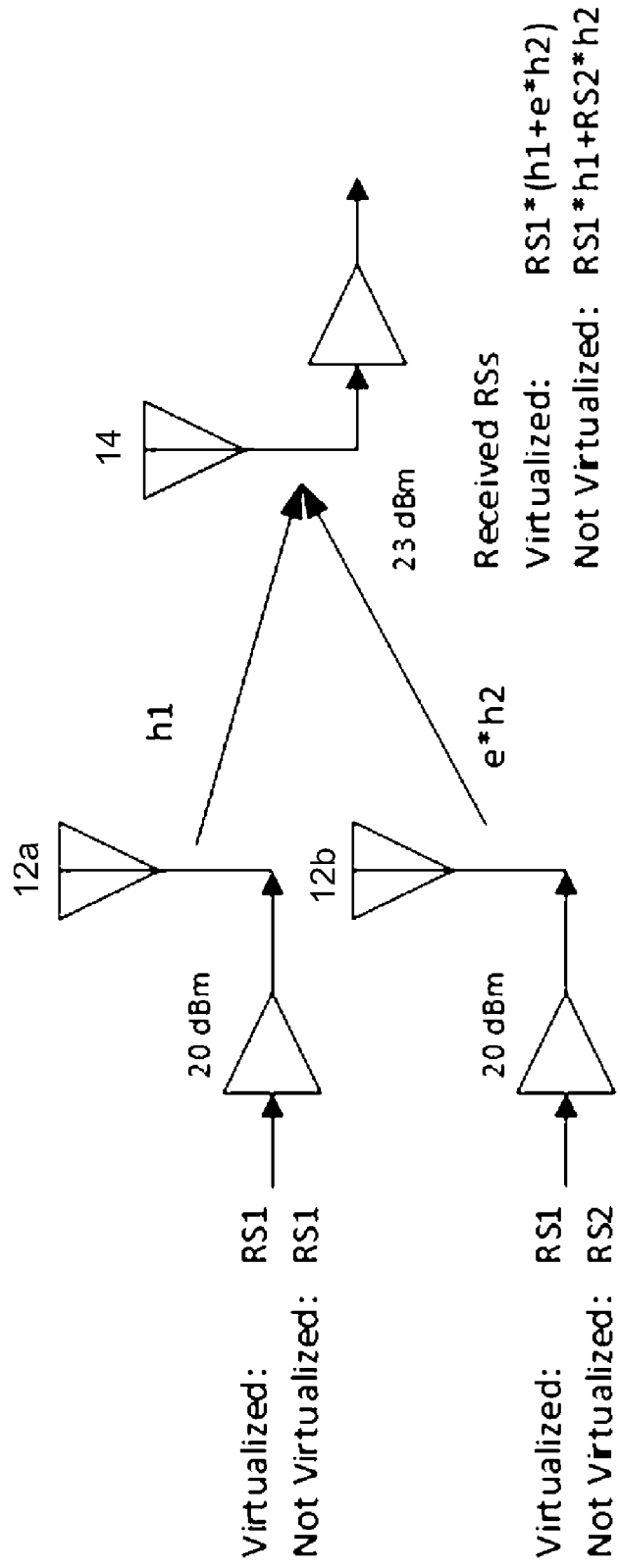
FIG. 1 is a block diagram illustrating antenna virtualization.
Figure 2:
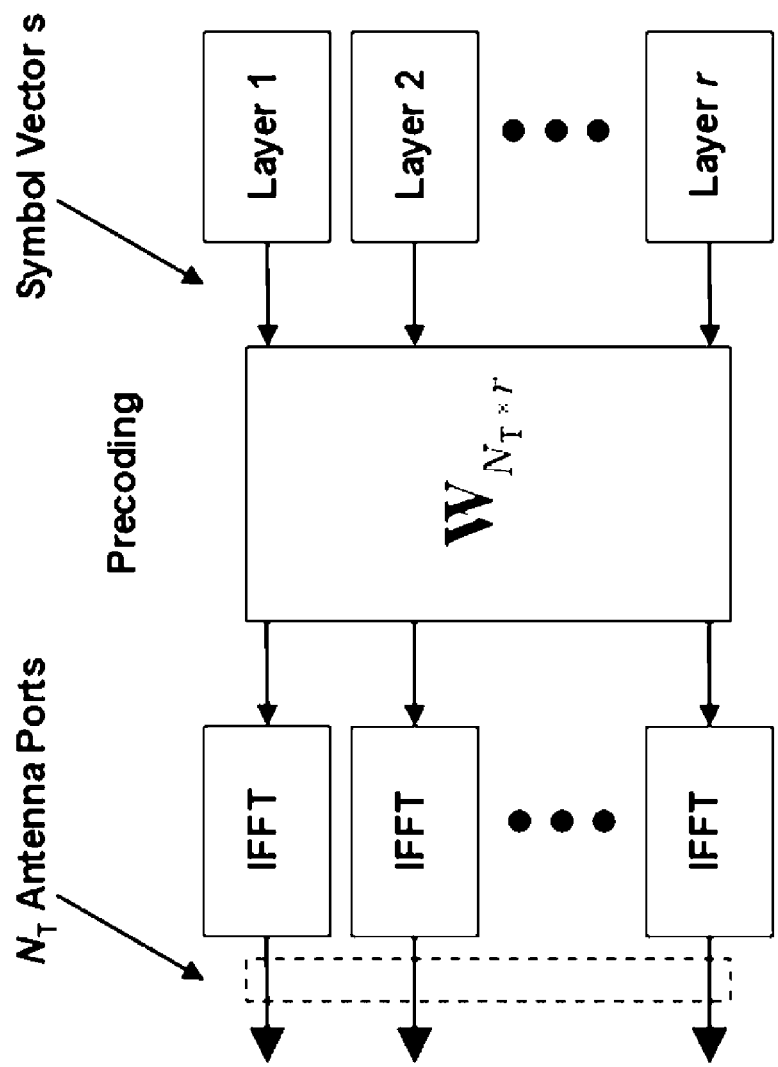
FIG. 2 is a block diagram illustrating the transmission structure of precoded spatial multiplexing mode in NR.

As described above, certain challenges currently exist with transmitting on a plurality of antennas. For example, specifying every possible power combination is signaling intensive, while other mechanisms may overly restrict when user equipment (UEs) may transmit at higher powers.

Certain aspects of the present disclosure and their embodiments may provide solutions to these or other challenges. For example, particular embodiments include power scaling mechanisms to support full power uplink multiple-input multiple-output (MIMO) transmission for UEs only capable of non-coherent operation. The supported power scaling values are signaled via UE capability either as ratios in a power scaling equation, or as a subset of transmit precoder matrix indicators (TPMIs) supporting full power operation, or a combination of a power scaling value and the TPMI that supports the power scaling value. An advantage of particular embodiments is that they convey uplink MIMO power transmission capability for a UE using a minimum amount of information while maximizing UE transmit chain and antenna implementation flexibility.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

A first set of embodiments uses the UE's ability to map antenna ports to transmit chains. Each antenna port is identified by the physical uplink shared channel (PUSCH)

demodulation reference signal (DMRS) and/or sounding reference signal (SRS) transmitted on the antenna port. Therefore, a UE can map a transmit chain to any of its ports by transmitting that port's corresponding reference signal.

For example, if a UE has a 23 dBm power amplifier (PA) on its second transmit chain, the UE can transmit antenna port 0 for SRS and for DMRS on the second transmit chain, thereby mapping it to antenna port 0. The other 3 ports for a 4 transmit chain UE can be mapped in the same way, and with any combination. Therefore, the number of PA power configurations needed to be specified can be reduced dramatically by supporting each PA power combination with the power sorted from greatest to least, rather than allowing multiple PA power combinations.

For example, a 4 transmit chain UE with 2 full power and 2¼ power PAs can be represented with a capability supporting the two full power PAs on the first and second antenna ports, as shown in Table 2. This may be contrasted with a design where the capability does not use a power ordering, shown in Table 3, where 6 different capabilities are needed. If a UE were to have PA powers mapped to its transmit chains according to power capabilities 2-6, embodiments supporting the power ordering in Table 2 map antenna ports such that the power capability is provided.

TABLE 2

PA power capability with power ordering

| | 0 | 1 | 2 | 3 |
|---|---|---|---|---|
| Power Capability #1 | 1 | 1 | ¼ | ¼ |

TABLE 3

Alternative PA power capability

| Power Capability # | Antenna Port | | | |
|---|---|---|---|---|
| | 0 | 1 | 2 | 3 |
| 1 | 1 | 1 | ¼ | ¼ |
| 2 | 1 | ¼ | 1 | ¼ |
| 3 | 1 | ¼ | ¼ | 1 |
| 4 | ¼ | 1 | 1 | ¼ |
| 5 | ¼ | 1 | ¼ | 1 |
| 6 | ¼ | ¼ | 1 | 1 |

Therefore, in some embodiments, a UE indicates its uplink MIMO transmission power capability by selecting a power transmission capability from a set of power transmission capabilities. A capability comprises a list of PA power value indications, where one value indication is given for each of a number of antenna ports supported for transmission by the UE.

A power value indication may be a power amplifier transmission power level in dBm or in milliwatts. Alternatively, a power value indication may be a ratio relative to the maximum power the UE is rated to transmit. A member of the set comprises a unique combination of power value indications, such that the combination of power value indications is only present once in the member and not the other members in the set of power transmission.

In some embodiments, each member may have its value indications sorted. For example, in some embodiments each stronger power value precedes a weaker power value indication in the list. Alternatively, weaker values could precede stronger values in the list.

PA powers available in the market tend to be particular common values. Furthermore, UEs may use PAs that have higher power capabilities than is required. Therefore, a small number of different PA power values need to be represented by the PA power value indications. Furthermore, the total transmission power of a UE is generally split evenly among uplink MIMO layers and among antenna ports that the UE is actively transmitting upon.

Therefore, in some embodiments supporting up to 4 transmit antennas in a UE, the PA power value indications may include power ratios that are one or more of the values in the set $\{1, 1/2, 1/3, \text{ and } 1/4\}$. Alternatively, if PA powers values are indicated as an absolute number such as dBm or milliwatts, the power values may be a maximum power value scaled by the ratio of one of the values of the set $\{1, 1/2, 1/3, \text{ and } 1/4\}$, such as in Table 4.

TABLE 4

UE Capability List with PA powers indicated in dBm

| | Antenna Port | PA Power Capability Number | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| 4 Port Configuration | 0 | 23 | 23 | 23 | 23 | 23 | 23 | 23 | 23 | 23 | 23 | 20 | 20 | 20 | 20 | 17 | 17 |
| | 1 | 23 | 23 | 23 | 23 | 23 | 20 | 20 | 20 | 17 | 17 | 20 | 20 | 17 | 17 | 17 | 17 |
| | 2 | 23 | 23 | 20 | 20 | 17 | 20 | 20 | 17 | 17 | 17 | 17 | 17 | 17 | 17 | 17 | 17 |
| | 3 | 23 | 20 | 20 | 17 | 17 | 20 | 17 | 17 | 17 | 17 | 17 | 17 | 17 | 17 | 17 | 17 |
| 2 Port Configuration | 0 | 23 | 23 | 23 | 23 | 23 | 23 | 23 | 23 | 23 | 23 | 23 | 20 | 20 | 20 | 20 | 17 |
| | 1 | 23 | 23 | 23 | 23 | 23 | 20 | 20 | 20 | 20 | 17 | 20 | 20 | 20 | 17 | 20 | 17 |
| 1 Port Configuration | 0 | 23 | 23 | 23 | 23 | 23 | 23 | 23 | 23 | 23 | 23 | 23 | 20 | 23 | 20 | 23 | 17 |

In Table 4, the maximum power value is 23 dBm and ratios of 1/2 and 1/4 are used to produce the power values 20 and 17 dBm, respectively. Table 4 identifies 16 UE capabilities that may be supported, and the power values that may be transmitted on an antenna port such as an SRS or PUSCH DMRS antenna port. An embodiment may comprise only the rows corresponding to a 4 port configuration in a 4 transmit antenna UE.

Additional embodiments may also support indication of power values associated with 2 port or 2 port and 1 port configurations in a 4 transmit antenna UE. The 2 port indications identify the transmit power when UEs operate with a 2 port antenna configuration rather than a 4 port configuration. In the two port configurations, the UE may or may not virtualize transmit chains to increase power on the antenna ports. Therefore, such embodiments may enable higher transmission power when the UE transmits according to the 2 port configuration rather than the 4 port configuration, as shown in configuration 13 of Table 4, where the UE has 20 dBm power available for two antenna ports in the 2 port configuration, but only one 20 dBm antenna port in the 4 port configuration.

The 1 port configuration has the same property that higher power may or may not be available according, for example, to the UE's ability to virtualize transmit chains. In some embodiments, the 1, 2, and 4 port configurations correspond to the number of SRS indicated to a UE in an SRS resource indicator (SRI) in an uplink grant to the UE, and the UE transmits with the power indicated by its capability for the number of ports in the configuration identified by the SRI.

Some embodiments avoid directly indicating the transmission power of antenna ports, because it may impact the ability of the UE to virtualize antenna ports as discussed above. An alternative to indicating transmission power directly in UE capability is to indicate a power level that can be transmitted as part of a power control procedure. For example, a UE may determine a power $\hat{P}_{PUSCH,b,f,c}(i, j, q_d, l)$, where $\hat{P}_{PUSCH,b,f,c}$ is a linear value of the total transmission power from the UE on all its transmit chains for PUSCH, as defined in 38.213 rev 15.6.0 section 7.1.

In Rel-15, in codebook based operation with more than one antenna port, the UE scales the linear value by the ratio of the number of antenna ports with a non-zero PUSCH transmission power to the maximum number of SRS ports supported by the UE in one SRS resource, $N_{tx}$. The UE then splits the power equally across the antenna ports on which the UE transmits the PUSCH with non-zero power. The scaling may alternatively be expressed as scaling by $$\delta = \frac{N_{nz}}{N_{tx}},$$

where $N_{nz}$ is number of antenna ports with a non-zero PUSCH transmission power. This means, for example, that rank 1 precoders with a single non-zero element are scaled down by a factor of $N_{tx}$, such that a transmission chain transmits at a factor of $N_{TX}$ less than maximum power capability of the UE even if the UE has greater maximum power on the transmission chain.

This can be mitigated by scaling by a smaller number factor than $N_{tx}$, such as a number of SRS ports configured to the UE in codebook based operation. For a 4 transmit chain UE configured with 2 SRS ports, the power could then be scaled down by 2, rather than 4. However, transmitting with fewer antenna ports than the maximum substantially reduces the number of different precoders available, because uplink MIMO codebook size grows with the number of antenna ports in the codebook. Therefore, enhanced performance can be obtained by allowing higher transmission power in the largest codebook size supported by the UE.

One approach to supporting larger transmission power for a given number of antenna ports is to modify the power scaling described above. The power $\hat{P}_{PUSCH,b,f,c}(i, j, q_d, l)$ may instead be scaled by $$\delta(k) = \min\left(1, \frac{N_{nz} \cdot \Delta(k)}{N_{srs}}\right),$$

where $N_{SRS}$ is a number of SRS transmission ports configured to the UE, and $\Delta(k)$ positive real number indicated by UE capability signaling, and that may be associated with a $k^{th}$ number of SRS ports. The purpose of the min ( ) operation is to prevent the UE from transmitting a higher power than its maximum rated power for precoders that lead to transmission on larger numbers of antenna ports, while still allowing $\Delta(k)$ to scale up the transmission power for precoders that lead to transmission on a smaller numbers of antenna ports.

If $\Delta(k)>1$, the corresponding power is scaled above the value used in Rel-15. For example, if a 4 transmit chain UE is configured with $N_{SRS}=4$ SRS ports, the Rel-15 power scaling would set $$\delta = \frac{N_{nz}}{N_{tx}} = \frac{1}{4}$$

for precoders with one non-zero element. However, if UE had all 1/2 power PAs, the new scaling with $\Delta(k)=2$ would be $$\delta(k) = \min\left(1, \frac{1 \cdot 2}{4}\right) = \frac{1}{2},$$

which allows 3 dB more power to be transmitted as compared to Rel-15.

The value of $\Delta(k)$ for a given port configuration corresponds to the power a given precoder could produce relative to $P_{CMAX} \cdot N_{nz}/N_{SRS}$, where $P_{CMAX}$ is the maximum transmit power capability of the UE. Considering for example configuration 16, the power 17 dBm would be produced for any number of ports when a precoder has a single non-zero value, which is 1/4 of $P_{CMAX}$, and so $\Delta(k)=1/4 \cdot \{1,2,4\}=(1/4,1/2,1)$ for $k=\{1,2,4\}$ corresponding to 1, 2, and 4 port configurations. On the other hand, in configuration 1, 23 dBm would be produced for any number of ports when a precoder has a single non-zero value, which is equal to $P_{CMAX}$, and so at least 23 dBm can be transmitted for any precoder, leading to $\Delta(k)=\{1,2,4\}$ for $k=\{1,2,3\}$ corresponding to 1, 2, and 4 port configurations.

Moreover, suitable values of $\Delta(k)$ to support the PA power capabilities of Table 4 are $\Delta=\{1/4, 1/2, 1, 2, 4\}$. Therefore, in some embodiments, a UE signals a plurality of power ratio values, each value corresponding to a transmission power capability and to uplink transmission with a number of antenna ports. In some embodiments, the UE may be configured with multiple SRS resources, where at least one of the resources with the number of antenna ports corresponds to the value. In one example embodiment, a UE signals a power ratio $\Delta(k) \in \{1/4, 1/2, 1, 2, 4\}$ for $k^{th}$ SRS resource of 3 SRS resources with 1, 2, and 4 SRS ports. Such embodiments would signal $5 \cdot 5 \cdot 5=125$ different value combinations for $k=1, 2, 3$ corresponding to 1, 2, and 4 SRS ports, and therefore consume 7 bits if jointly encoded.

As described above and with respect to Table 4, it is sufficient and desirable to support a limited number of PA power combinations in a specification. Therefore, embodiments may determine the scale factor according to UE power combinations that should be supported in specifications. Because the maximum power available on each transmit chain is a fixed value, the value $\Delta(k)$ for the $k^{th}$ number of SRS ports, or equivalently a total number of antenna ports available for transmission, is dependent on power available for a greater or lesser number of SRS ports supported by the UE. This means that certain combinations of $\Delta(k)$ values may not be needed to support the desired PA configurations.

For example, Table 5 contains the Δ(k) combinations that are sufficient to support the PA power combinations listed in Table 4. Therefore, a joint indication of Δ(k) values for different numbers of antenna ports may reduce the overall signaling required. Table 5 contains 9 unique values, as compared to the 125 values that would be needed for the independent signaling of Δ(k) discussed above. This means that 4, rather than 7 bits could be used for UE capability signaling.

Furthermore, if one of the capabilities of Table 4 could be removed, only 8 states and 3 bits would be needed to convey Δ(k). One candidate for removal is capability 16, which has no capability for virtualization and is low power. This would then remove Capability 1 in Table 5, resulting in an alternative embodiment with only capabilities 2-9. Therefore, in some such embodiments where a UE signals a plurality of power ratio values, a transmission capability identifies a plurality of power ratio values, each associated with a different number of antenna ports.

TABLE 5

Power scaling values suitable for UE PA configurations in Table 4

| Power Scaling Capability # | Δ(1) | Δ(2) | Δ(3) |
|---|---|---|---|
| 1 | 0.25 | 0.5 | 1 |
| 2 | 0.5 | 0.5 | 1 |
| 3 | 0.5 | 1 | 1 |
| 4 | 1 | 0.5 | 1 |
| 5 | 1 | 1 | 1 |
| 6 | 1 | 1 | 2 |
| 7 | 1 | 2 | 1 |
| 8 | 1 | 2 | 2 |
| 9 | 1 | 2 | 4 |

Some embodiments may use power scaling as $$\delta(k) = \min\left(1, \frac{N_{nz} \cdot \Delta(k)}{N_{srs}}\right)$$

but the UE capability signaled is based on the approach presented in Table 4. Some embodiments may extend Table 4 as illustrated in Table 6 below. Here, Δ(k), which in turn will be used for the power scaling, is given by the capability number. In another embodiment Δ(k) is instead derived according to some function depending on the UE capability as given by Table 4.

TABLE 6

Δ(k) capability set given from PA Power Capability number

| Capability Number (as given by Table 4) | | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Δ(k) capability set (as given by Table 5) | 9 | 8 | 8 | 7 | 7 | 6 | 5 | 5 | 5 | 4 | 5 | 3 | 5 | 2 | 5 | 1 |

Because NR does not define a 3 port uplink MIMO codebook nor a 3 port SRS configuration, Rel-15 NR rank 3 uplink MIMO transmission is based on 4 port configurations. The power in Rel-15 uses the maximum number of antenna ports in an SRS configuration, and so divides by 4 (that is, has $N_{tx}=4$ in the equation for S above) for rank 3 transmission. This means that a UE with all 1/4 power PAs would transmit at most 3/4 of its rated power for rank 3 transmission using rank 3 TPMI #0 (where each of 3 antenna ports transmits a MIMO layer). However, a UE with at least 3 PAs at 1/3 power will be able to deliver the full rated power for rank 3 TPMI #0. Therefore, PA configurations including those with 1/3 power may be supported by power scaling values.

Table 7 adds a number of UE PA power configurations capable of supporting the full rated power of 23 dBm, by adding PA power values of 1/3 the rated power (approximately 18.25 dBm). In some embodiments, a UE may signal a PA power configuration from Table 7, Table 8, and Table 9 to indicate its uplink MIMO power capability for each of 4, 2, and 1 antenna ports, respectively.

TABLE 7

Alternative UE Capability with PA powers indicated in dBm: 4 antenna ports

| Antenna Port | Configuration # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 23 | 23 | 23 | 23 | 23 | 23 | 23 | 23 | 23 | 23 | 20 | 20 |
| 1 | 23 | 23 | 23 | 23 | 23 | 20 | 20 | 20 | 17 | 17 | 20 | 20 |
| 2 | 23 | 23 | 20 | 20 | 17 | 20 | 20 | 17 | 17 | 17 | 17 | 17 |
| 3 | 23 | 20 | 20 | 17 | 17 | 20 | 17 | 17 | 17 | 17 | 17 | 17 |

| Antenna Port | Configuration # | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| 0 | 20 | 20 | 17 | 17 | 23 | 23 | 23 | 23 | 23 | 23 | 23 | 23 |
| 1 | 17 | 17 | 17 | 17 | 23 | 23 | 23 | 23 | 23 | 20 | 20 | 20 |
| 2 | 17 | 17 | 17 | 17 | 23 | 23 | 20 | 20 | 18.25 | 20 | 20 | 18.25 |
| 3 | 17 | 17 | 17 | 17 | 23 | 20 | 20 | 17 | 18.25 | 20 | 17 | 18.25 |

| | Configuration # | | | | | | | |
|---|---|---|---|---|---|---|---|---|
| | 25 | 26 | 27 | 28 | 29 | 30 | 31 | 32 |
| 0 | 23 | 23 | 20 | 20 | 20 | 20 | 18.25 | 18.25 |
| 1 | 18.25 | 18.25 | 20 | 20 | 18.25 | 18.25 | 18.25 | 18.25 |

TABLE 7-continued

Alternative UE Capability with PA powers indicated in dBm: 4 antenna ports

| | | | | | | | | |
|---|---|---|---|---|---|---|---|---|
| 2 | 18.25 | 18.25 | 18.25 | 18.25 | 18.25 | 18.25 | 18.25 | 18.25 |
| 3 | 18.25 | 18.25 | 18.25 | 18.25 | 18.25 | 18.25 | 18.25 | 18.25 |

TABLE 8

Alternative UE Capability with PA powers indicated in dBm: 2 antenna ports

| Antenna Port | Configuration # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 23 | 23 | 23 | 23 | 23 | 23 | 23 | 23 | 23 | 23 | 23 | 20 |
| 1 | 23 | 23 | 23 | 23 | 23 | 20 | 20 | 20 | 20 | 17 | 20 | 20 |

| | Configuration # | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| 0 | 20 | 20 | 20 | 17 | 23 | 23 | 23 | 23 | 23 | 23 | 23 | 23 |
| 1 | 20 | 17 | 20 | 17 | 23 | 23 | 23 | 23 | 23 | 20 | 20 | 20 |

| | Configuration # | | | | | | | |
|---|---|---|---|---|---|---|---|---|
| | 25 | 26 | 27 | 28 | 29 | 30 | 31 | 32 |
| 0 | 23 | 23 | 23 | 20 | 20 | 20 | 20 | 18.25 |
| 1 | 20 | 18.25 | 20 | 20 | 20 | 18.25 | 20 | 18.25 |

TABLE 9

Alternative UE Capability with PA powers indicated in dBm, for 1 antenna port

| Antenna Port | Configuration # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 23 | 23 | 23 | 23 | 23 | 23 | 23 | 23 | 23 | 23 | 23 | 20 |

| | Configuration # | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| 0 | 23 | 20 | 23 | 17 | 23 | 23 | 23 | 23 | 23 | 23 | 23 | 23 |

| | Configuration # | | | | | | | |
|---|---|---|---|---|---|---|---|---|
| | 25 | 26 | 27 | 28 | 29 | 30 | 31 | 32 |
| 0 | 23 | 23 | 23 | 20 | 23 | 20 | 23 | 18.25 |

Because the alternative set of UE PA power combinations in Table 7, Table 8, and Table 9 include new PA power values, if values of $\Delta(k)$ are to support these new power values, new $\Delta(k)$ values may be needed. Examining these tables indicates that 15 distinct combinations of $\Delta(1)$, $\Delta(2)$, and $\Delta(3)$ are sufficient to support the PA power combinations in the table. The values of 0.75 and 1.25 are needed for $\Delta(k)$ to support the 18.25 dBm (or equivalently the 13 power) PAs.

Therefore, in some embodiments, a UE signals a plurality of power ratio values, each value corresponding to a transmission power capability for corresponding to a number of antenna ports for which the UE can be configured. In an example embodiment a UE signals each power ratio as $\Delta(k) \in \{1/4, 1/2, 3/4, 1, 5/4, 2, 4\}$. Such embodiments signal $7 \cdot 7 \cdot 7 = 343$ different value combinations for $k=1, 2, 3$ corresponding to 1, 2, and 4 SRS ports, and therefore consume 9 bits if jointly encoded. If instead the 15 different capabilities in Table 10 are signaled, then only 4 bits are needed to indicate the $\Delta(k)$ values enabling enhanced support for rank 3 operation. The 15 different power ratio combinations is roughly half the 32 PA power configurations, and so the PA power ratio signaling is more efficient in terms of signaling overhead.

TABLE 10

Power scaling values suitable for UE PA configurations in Table 7, Table 8, and Table 9

| Power Scaling Capability # | $\Delta(1)$ | $\Delta(2)$ | $\Delta(3)$ |
|---|---|---|---|
| 1 | 0.25 | 0.50 | 1 |
| 2 | 0.25 | 0.75 | 1.25 |
| 3 | 0.50 | 0.50 | 1 |
| 4 | 0.50 | 0.75 | 1.25 |
| 5 | 0.50 | 1 | 1 |
| 6 | 0.50 | 1 | 1.25 |
| 7 | 1 | 0.50 | 1 |
| 8 | 1 | 0.75 | 1.25 |
| 9 | 1 | 1 | 1 |
| 10 | 1 | 1 | 1.25 |
| 11 | 1 | 1 | 2 |
| 12 | 1 | 2 | 1 |
| 13 | 1 | 2 | 1.25 |
| 14 | 1 | 2 | 2 |
| 15 | 1 | 2 | 4 |

Some embodiments include full power TPMI combination capability. For example, adjusting power by $\Delta(k)$ for a $k^{th}$ antenna port configuration enables the power to be scaled up for all precoders in the codebook with the number of ports. However, if UEs have different power capabilities for the different transmit chains, such that some ports have different maximum transmit power, because the UE must transmit power equally on the non-zero transmit antenna ports, the UE is limited by the smallest power that the UE can transmit on an antenna port. This means that some precoders can deliver full power, while others cannot. Therefore, it can be advantageous to signal power transmission capability according to the precoder used.

Rather than signalling if a given precoder can be supported with one bit per precoder, a more efficient signalling method accounts for the supported PA power combinations and jointly signals which TPMI combinations are supported according to the number of configured SRS ports or alternative, the ports used in the codebook(s) configured for the UE.

One embodiment is shown in Table 11 for UEs with non-coherent capability. Each of the elements in the table indicates a list of TPMIs of the form $P_i(N_p, v)$ or that no TPMI is supported with a '-' for this rank and number of antenna ports for the given capability number. The entries are defined according to Table 12. Note that Table 12 does not contain all the precoders present in the Rel-15 NR codebooks, because the PA power ordering that is to be supported does not require these TPMIs. This reduces the number of TPMI combinations needed in the UE TPMI capability signalling. Also, 14 distinct TPMI combination capabilities are used to represent the PA power combinations in Table 4. Therefore, one embodiment indicates UE PA power capability by indicating which of a list of TPMI combination capabilities is supported by the UE for full power transmission.

A capability comprises a combination of supported TPMI sets, wherein a subset of the TPMIs available in a MIMO codebook may not be indicated as a supported TPMI. In some embodiments, a TPMI combination capability comprises a first supported TPMI set associated with a first number of antenna ports and a second supported TPMI set associated with a second number of antenna ports that is different than the first number of antenna ports.

TABLE 12

Supported TPMI sets corresponding to Table 11

| 1 Port | 2 Ports | 4 Ports |
|---|---|---|
| $P_1(1, 1) = 1$ | $P_1(2, 1) = TPMI_0$ | $P_1(4, 1) = \{TPMI_0\}$ |
| | $P_2(2, 1) = \{TPMI_0, TPMI_1\}$ | $P_2(4, 1) = \{TPMI_0, TPMI_1\}$ |
| | $P_1(2, 2) = TPMI_0$ | $P_3(4, 1) = \{TPMI_0, TPMI_1, TPMI_2\}$ |
| | | $P_4(4, 1) = \{TPMI_0, TPMI_1, TPM_2, TPMI_3\}$ |
| | | $P_1(4, 2) = \{TPMI_0\}$ |
| | | $P_2(4, 2) = \{TPMI_0, TPMI_1, TPMI_3\}$ |
| | | $P_3(4, 2) = \{TPMI_0, TPMI_1, TPMI_2, TPMI_3, TPMI_4, TPMI_5\}$ |
| | | $P_1(4, 3) = \{TPMI_0\}$ |
| | | $P_1(4, 4) = \{TPMI_0\}$ |

The power scaling used in this embodiment adjusts to full power when TPMIs that support full power are used and uses the Rel-15 codebook based power scaling otherwise. That is the UE scales the linear transmission power $$\hat{P}_{PUSCH,b,f,c} \text{ by } \delta = \frac{N_{nz}}{N_{tx}},$$

as described above when using a precoder (identified by its TPMI index) that does not support full power. When the UE does transmit with a precoder supporting full power, the UE transmits with the linear transmission power $\hat{P}_{PUSCH,b,f,c}$. In both the cases where the TPMI does and does not support full power, the power and scaled power, respectively, is divided equally among antenna ports with non-zero transmission power.

In some embodiments, the tables presented above may be defined per UE coherence capability. Thus, one set of tables

TABLE 11

UE TPMI combination capabilities corresponding to Table 4

| | | TPMI Capability # | | | | | | |
|---|---|---|---|---|---|---|---|---|
| | Rank | 1 | 2 | 3 | 4 | 5 | 6 | 7 |
| 4 Port Configuration | 1 | — | $P_1(4,1)$ | — | $P_1(4, 1)$ | — | — | $P_1(4, 1)$ |
| | 2 | — | — | — | — | $P_1(4, 2)$ | $P_1(4, 2)$ | $P_1(4, 2)$ |
| | 3 | — | — | — | — | — | — | — |
| | 4 | $P_1(4, 4)$ | $P_1(4, 4)$ | $P_1(4, 4)$ | $P_1(4, 4)$ | $P_1(4, 4)$ | $P_1(4, 4)$ | $P_1(4, 4)$ |
| 2 Port Configuration | 1 | — | $P_1(2, 1)$ | — | $P_1(2, 1)$ | — | $P_1(2, 1)$ | $P_1(2, 1)$ |
| | 2 | — | — | $P_1(2, 2)$ | $P_1(2, 2)$ | $P_1(2, 2)$ | $P_1(2, 2)$ | $P_1(2, 2)$ |
| 1 Port Configuration | 0 | — | $P_1(1, 1)$ | $P_1(1, 1)$ | $P_1(1, 1)$ | — | $P_1(1, 1)$ | $P_1(1, 1)$ |

| | | TPMI Capability # | | | | | | |
|---|---|---|---|---|---|---|---|---|
| | Rank | 8 | 9 | 10 | 11 | 12 | 13 | 14 |
| 4 Port Configuration | 1 | $P_2(4, 1)$ | $P_1(4, 1)$ | $P_2(4, 1)$ | $P_1(4, 1)$ | $P_2(4, 1)$ | $P_3(4, 1)$ | $P_4(4, 1)$ |
| | 2 | $P_1(4, 2)$ | $P_2(4, 2)$ | $P_2(4, 2)$ | $P_3(4, 2)$ | $P_3(4, 2)$ | $P_3(4, 2)$ | $P_3(4, 2)$ |
| | 3 | — | $P_1(4, 3)$ | $P_1(4, 3)$ | $P_1(4, 3)$ | $P_1(4, 3)$ | $P_1(4, 3)$ | $P_1(4, 3)$ |
| | 4 | $P_1(4, 4)$ | $P_1(4, 4)$ | $P_1(4, 4)$ | $P_1(4, 4)$ | $P_1(4, 4)$ | $P_1(4, 4)$ | $P_1(4, 4)$ |
| 2 Port Configuration | 1 | $P_2(2, 1)$ | $P_1(2, 1)$ | $P_2(2, 1)$ | $P_1(2, 1)$ | $P_2(2, 1)$ | $P_2(2, 1)$ | $P_2(2, 1)$ |
| | 2 | $P_1(2, 2)$ | $P_1(2, 2)$ | $P_1(2, 2)$ | $P_1(2, 2)$ | $P_1(2, 2)$ | $P_1(2, 2)$ | $P_1(2, 2)$ |
| 1 Port Configuration | 0 | $P_1(1, 1)$ | $P_1(1, 1)$ | $P_1(1, 1)$ | $P_1(1, 1)$ | $P_1(1, 1)$ | $P_1(1, 1)$ | $P_1(1, 1)$ |

As used in Table 11, $P_i(N_p, v)$ is the $i^{th}$ list of precoders for an $N_p$ antenna port codebook for rank v, defined in Table 12. $TPMI_l$ is the precoder with TPMI index 1 in the NR uplink MIMO codebooks for rank v and $N_p$ antenna ports in tables 6.3.1.5-1 through 6.3.1.5-7 of 3GPP TS 38.211 rev. 15.6.0 section 6.3.1.5.

may exist for a coherent UE and another set of tables may exist for a partial coherent UE. Alternatively, a single table may be used, but some entries are only applicable to a certain UE coherence capability. This is illustrated by one specific UE TPMI combination capability as presented below assuming a partial coherent UE (only the 4 port configuration is shown). The sets of used TPMI sets in this case are different than for a coherent UE. This TPMI capability could, for example, be realized by a 4 port partial coherent UE with 17 dBm per PA.

TABLE 13

UE TPMI combination capability example for a partial coherent UE

| | Rank | TPMI Capability # 1 |
|---|---|---|
| 4 Port Configuration | 1 | — |
| | 2 | $P_4(4, 2)$ |
| | 3 | $P_2(4, 3)$ |
| | 4 | $P_2(4, 4)$ |

TABLE 14

Additional TPMI sets for a partial coherent UE 4 Ports $P_4(4, 2) = \{TPMI_6, TPMI_7, TPMI_8, TPMI_9, TPMI_{10}, TPMI_{11}, TPMI_{12}, TPMI_{13}\}$
$P_2(4, 3) = \{TPMI_1, TPMI_2\}$
$P_2(4, 4) = \{TPMI_1, TPMI_2\}$ index 1 in a codebook from section 6.3.1.5 of 3GPP TS 38.211 rev. 15.6.0 with the number of antenna ports and for rank v. The power scaling for PUSCH antenna transmission may be calculated according to $$\delta(k) = \min\left(1, \frac{N_{nz} \cdot \Delta(k)}{N_{srs}}\right)$$

as described above for all precoders that are not associated with a TPMI. When a precoder is associated with a power scaling value, the power scaling is calculated according to $$\delta(k) = \min\left(1, \frac{N_{nz} \cdot \Delta(k, TPMI_l(v))}{N_{srs}}\right).$$

Some embodiments include complete TPMI and PA power capabilities dependent power scaling. In one embodiment, the power scaling is given as δ(k, l, v) and is directly specified as a function of UE capability as well as (k, l, v) where l and v gives the precoder. δ(k, l, v) may for instance be given in the form of a table as described below and the UE capability is given according to Table 4.

TABLE 15

Power scaling values δ (k, l, v)

| | k | l | v | Capability Number | | | | | | | | | | | | | | | |
|---|---|---|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 | 14 | 15 | 16 |
| 4 Port Configuration | 0 | 1 | 1 | 1 | 1 | 1 | 1 | 1 | 1 | 1 | 1 | 1 | 1 | ½ | ½ | ½ | ½ | ¼ | ¼ |
| | 1 | 1 | 1 | 1 | 1 | 1 | 1 | ½ | ½ | ½ | ½ | ¼ | ¼ | ½ | ¼ | ¼ | ¼ | ¼ | ¼ |
| | 2 | 1 | 1 | 1 | 1 | ½ | ½ | ¼ | ½ | ½ | ¼ | ¼ | ¼ | ¼ | ¼ | ¼ | ¼ | ¼ | ¼ |
| | 3 | 1 | 1 | ½ | ½ | ¼ | ¼ | ½ | ¼ | ¼ | ¼ | ¼ | ¼ | ¼ | ¼ | ¼ | ¼ | ¼ | ¼ |
| | 0 | 2 | 1 | 1 | 1 | 1 | 1 | 1 | 1 | ½ | ½ | 1 | 1 | ½ | ½ | ½ | ½ | ½ | ½ |
| | 1 | 2 | 1 | 1 | 1 | 1 | ½ | 1 | 1 | ½ | ½ | ½ | ½ | ½ | ½ | ½ | ½ | ½ | ½ |
| | 2 | 2 | 1 | 1 | 1 | ½ | ½ | 1 | ½ | ½ | ½ | ½ | ½ | ½ | ½ | ½ | ½ | ½ | ½ |
| | 3 | 2 | 1 | 1 | 1 | 1 | ½ | 1 | 1 | ½ | ½ | ½ | ½ | ½ | ½ | ½ | ½ | ½ | ½ |
| | 4 | 2 | 1 | 1 | 1 | 1 | ½ | 1 | ½ | ½ | ½ | ½ | ½ | ½ | ½ | ½ | ½ | ½ | ½ |
| | 5 | 2 | 1 | 1 | 1 | ½ | ½ | 1 | ½ | ½ | ½ | ½ | ½ | ½ | ½ | ½ | ½ | ½ | ½ |
| | 0 | 3 | 1 | 1 | 1 | 1 | 1 | ¾ | 1 | 1 | ¾ | ¾ | ¾ | ¾ | ¾ | ¾ | ¾ | ¾ | ¾ |
| | 0 | 4 | 1 | 1 | 1 | 1 | 1 | 1 | 1 | 1 | 1 | 1 | 1 | 1 | 1 | 1 | 1 | 1 | 1 |
| 2 Port Configuration | 0 | 1 | 1 | 1 | 1 | 1 | 1 | 1 | 1 | 1 | 1 | 1 | 1 | 1 | ½ | ½ | ½ | ½ | ¼ |
| | 1 | 1 | 1 | 1 | 1 | 1 | 1 | 1 | ½ | ½ | ½ | ½ | ¼ | ½ | ½ | ½ | ¼ | ½ | ¼ |
| | 0 | 2 | 1 | 1 | 1 | 1 | 1 | 1 | 1 | 1 | 1 | 1 | ½ | 1 | 1 | 1 | ½ | 1 | ½ |
| 1 Port Configuration | 0 | 1 | 1 | 1 | 1 | 1 | 1 | 1 | 1 | 1 | 1 | 1 | 1 | ½ | 1 | ½ | 1 | ¼ |

Some embodiments include per TPMI PA power ratio capabilities. While TPMI combination capability signalling may indicate more TPMIs that can be used to convey full power in some situations, thereby allowing the UE to transmit full power, than signalling (k) as described above, TPMI combination capability signalling has the drawback that it does not convey the power available for TPMIs other than the TPMIs signalled. Therefore, in some embodiments it is desirable to combine TPMI capability signalling with power ratio capability signalling with Δ(k).

Some embodiments associate a TPMI of a given rank and number of ports with a power ratio, that is to define a power ratio Δ(k, TPMI$_l$(v)) for a number of antenna ports associated with k and where TPMI$_l$(v) is a precoder with TPMI In another embodiment the value Δ(k, TPMI$_l$(v)) is instead specified in the table above in a similar manner. In yet another embodiment, the capability number is instead specified according Table 5 and the table is specified accordingly.

Some embodiments include UE coherence capability in NR. In some embodiments, the above embodiments also depend on the UE coherence capability for full, partial, or non-coherent uplink MIMO transmission as identified by the pusch-TransCoherence capability in 3GPP TS 38.331 rev. 15.5.0. For example, Table 6, Table 11, Table 12 and Table 13 or some other table or function presented herein may also depend on the UE coherence capability. Table 6 may, for example, look different and also depend on if a UE supports full, partial, or non-coherent uplink MIMO transmission. Therefore, in some embodiments a transmission power capability corresponds to PUSCH transmission using an uplink MIMO precoder subset identified as one of 'fullyAndPartialAndNonCoherent', 'partialCoherent', and 'nonCoherent', respectively, in 3GPP TSs 38.212 rev 15.6.0, 38.214 rev 15.6.0, and 38.331 rev 15.5.0.

Figure 3:
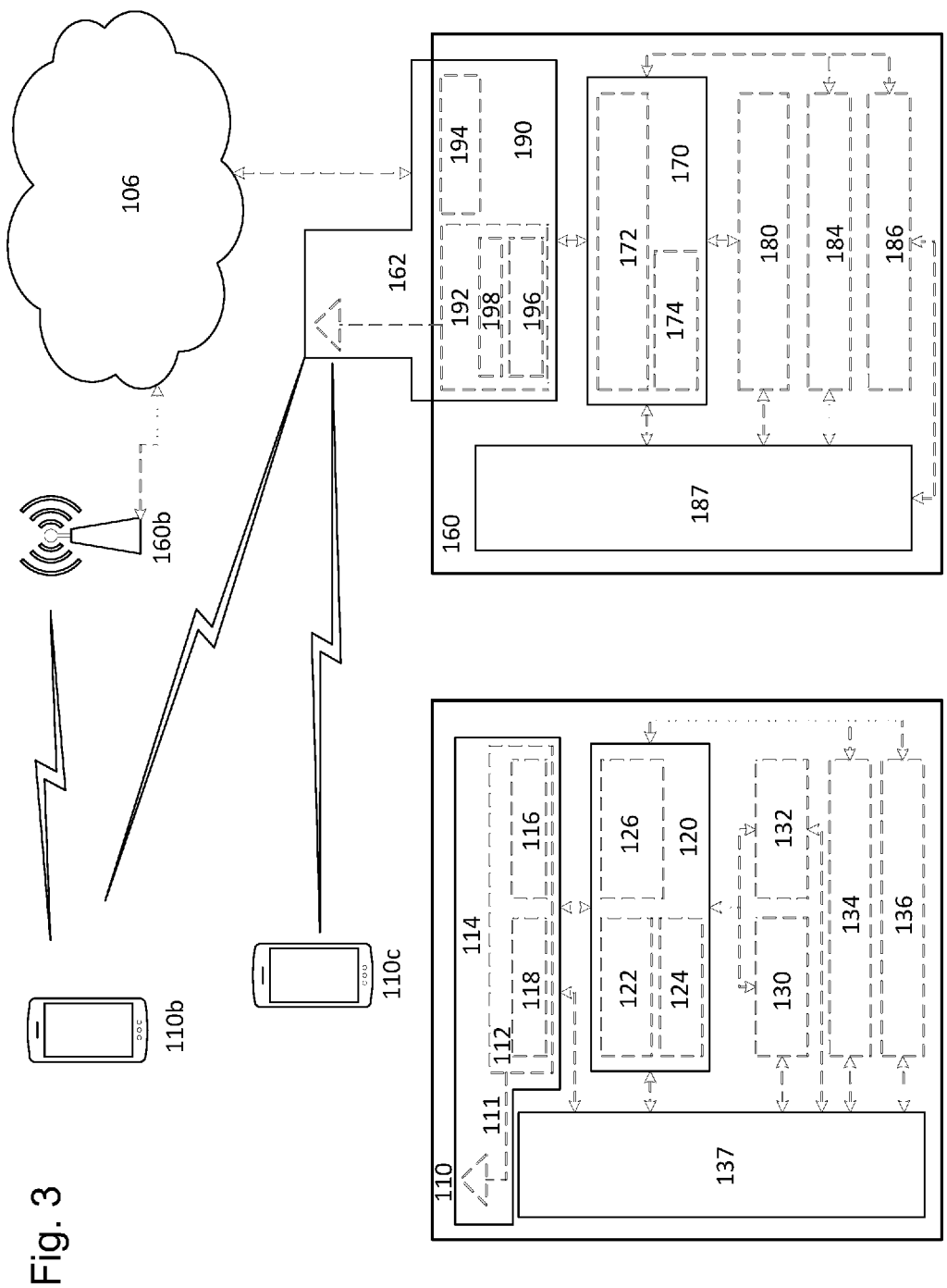
FIG. 3 is a block diagram illustrating an example wireless network.

FIG. 3 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 4:
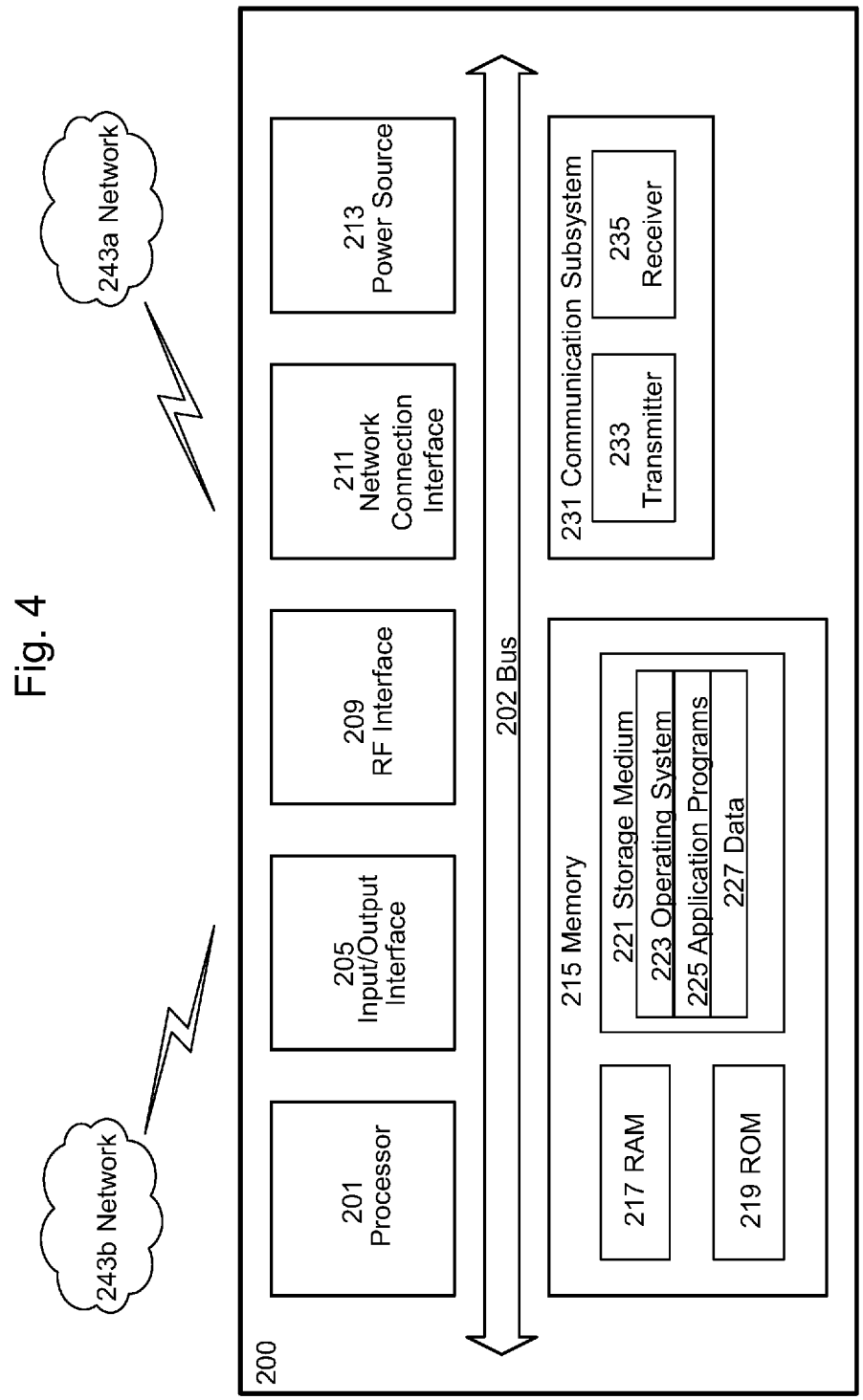
FIG. 4 illustrates an example user equipment, according to certain embodiments.

FIG. 4 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
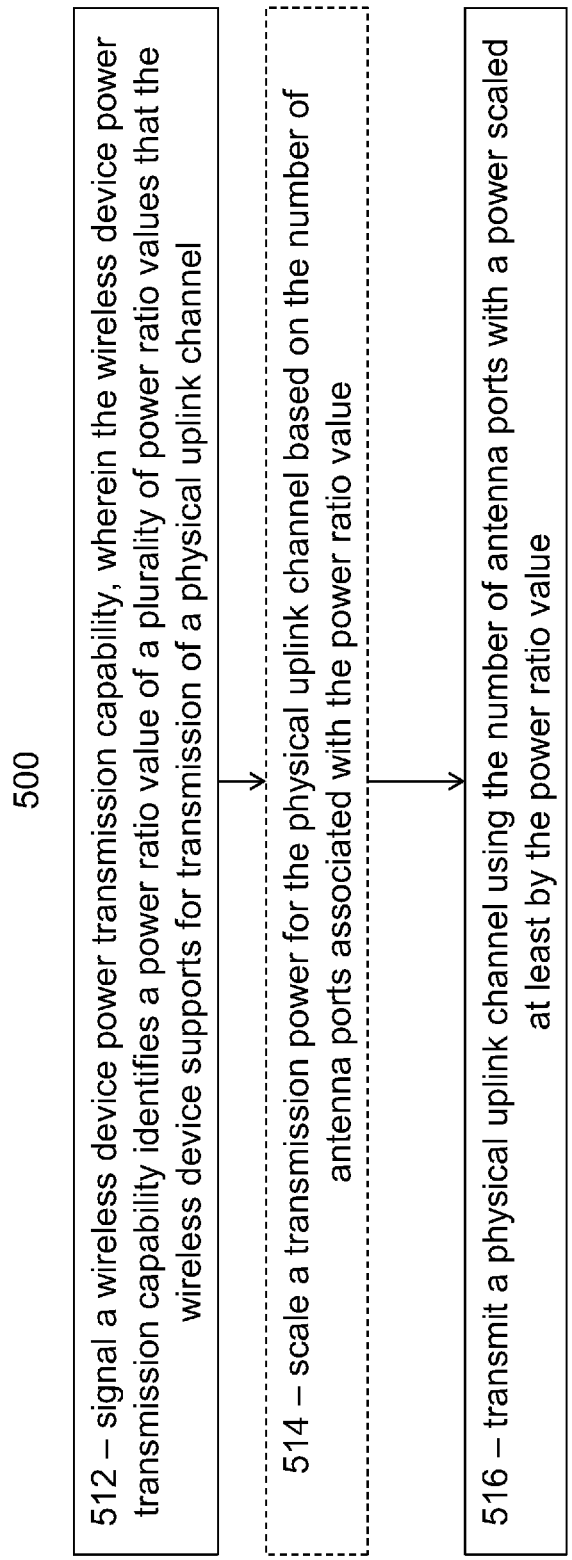
FIG. 5 is flowchart illustrating an example method in a wireless device, according to certain embodiments.

FIG. 5 is a flowchart illustrating an example method in a user equipment, according to certain embodiments. In particular embodiments, one or more steps of FIG. 5 may be performed by wireless device 110 described with respect to FIG. 3.

The method begins at step 512, where the wireless device (e.g., wireless device 110) signals, to a network node (e.g., network node 160), a wireless device power transmission capability. The wireless device power transmission capability identifies a power ratio value of a plurality of power ratio values that the wireless device supports for transmission of a physical uplink channel. Each value of the plurality of power ratio values corresponds to a transmission power capability and to a number of antenna ports. A power ratio refers to a ratio relative to a maximum power the wireless device is rated to transmit. The power transmission capability may comprise any of the power transmission capabilities described above, such as those described with respect to Tables 2-15.

In particular embodiments, the transmission power capability identifies a plurality of power ratio values, each associated with a number of physical uplink channel layers, a precoder to be used to transmit the physical uplink channel, and the number of antenna ports. In some embodiments, power ratios are jointly encoded. The transmission power capability may identify a plurality of power ratio values, each associated with a different number of antenna ports. In some embodiments, power scaling is further associated with coherence capability of the UE. The transmission power capability may correspond to a codebook subset. The subset is identified as containing at least one of fully and partial and non-coherent precoders, partial and non-coherent precoders, and non-coherent precoders.

In some embodiments, a second power ratio may be associated with a TPMI. In particular embodiments, the transmission power capability further comprises a second power ratio of the plurality of power ratio values and a precoder that the wireless device may use for physical uplink channel transmission with the power scaled by the second power ratio and with the number of antenna ports.

The network node receives the power transmission capability for the wireless device and determines an appropriate configuration for a particular uplink transmission. The network node may schedule the wireless device for the uplink transmission.

At step 516, the wireless device transmits a physical uplink channel using the number of antenna ports with a power scaled at least by the power ratio value in the power transmission capability.

Some embodiments may use power scaling with a minimum function to not transmit above $P_{CMAX}$, and scales according to the number of SRS ports associated with the power ratio. Some embodiments may include optional step 514, where the wireless device scales a transmission power for the physical uplink channel based on the number of antenna ports associated with the power ratio value. The scaling may be limited so that the scaled transmission power does not exceed the maximum value the wireless device is rated to transmit. The scaling may be by a factor $$\delta(k) = \min\left(1, \frac{N_{nz} \cdot \Delta(k)}{N_{srs}}\right),$$

wherein $\Delta(k)$ is a power ratio value and a real positive real number, $N_{nz}$ is a number of antenna ports with non-zero transmission power used to transmit the physical uplink channel, and $N_{SRS}$ is a number of antenna ports and a number of sounding reference signal (SRS) ports in an SRS resource with index k configured to the wireless device.

Modifications, additions, or omissions may be made to method 500 of FIG. 5. Additionally, one or more steps in the method of FIG. 5 may be performed in parallel or in any suitable order.

In some embodiments, only a subset of TPMIs in TPMI capability signaling can support full power. A UE implementation can remap its PAs to match. Rel-15 or Rel-15-like scaling may be used for non-full power TPMIs. An example is illustrated in FIG. 6.

Figure 6:
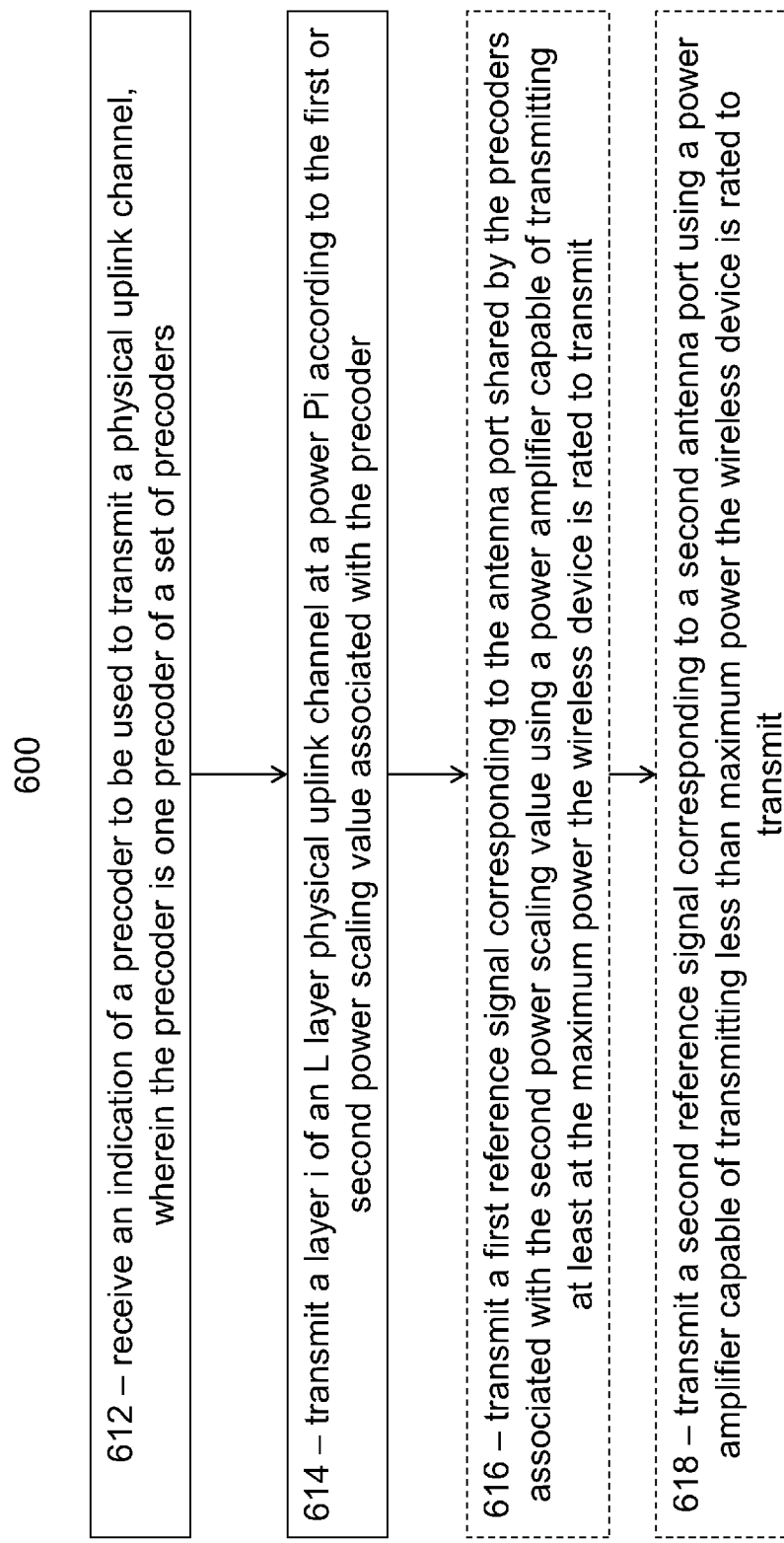
FIG. 6 is a flowchart illustrating another example method in a wireless device, according to certain embodiments.

FIG. 6 is a flowchart illustrating another example method in a wireless device, according to certain embodiments. In particular embodiments, one or more steps of FIG. 6 may be performed by wireless device 110 described with respect to FIG. 3.

The method begins at step 612, where the wireless device (e.g., wireless device 110) receives an indication of a precoder to be used to transmit a physical uplink channel. The precoder is one precoder of a set of precoders. Each precoder in the set of precoders is a matrix or vector comprising an equal number of non-zero elements. A first precoder in the set of precoders is able to be associated with a first power scaling value or a second power scaling value, and a second precoder in the set of precoders is only able to be associated with the second power scaling value. For example, the wireless device may receive an indication as described with respect to Tables 11 and/or 12 above.

At step 614, the wireless device transmits a layer i of an L layer physical uplink channel at a power $P_i$ according to the first or second power scaling value associated with the precoder. For example, power scaling used in this embodiment adjusts to full power when TPMIs that support full power are used and uses the Rel-15 codebook based power scaling otherwise.

In particular embodiments, the first power scaling value is $P_i=P/L$, where P is the total power to be used for physical uplink channel transmission, and the second power scaling value is $P_i=PR/L$, where $R=M/K$, M is a number of antenna ports with non-zero physical uplink channel transmission. K is one of: a maximum number of physical uplink channel layers supported by the wireless device, a number of antenna ports used in a codebook configured for the wireless device, a maximum rank configured to the wireless device, and a number of SRS ports configured to the wireless device for one or both of codebook and non-codebook based operation.

In some embodiments, the wireless device maps strongest transmit chain to the same antenna port, and a weaker transmit chain to a different port. At optional step 616, the wireless device transmits a first reference signal corresponding to the antenna port shared by the precoders associated with the second power scaling value using a power amplifier capable of transmitting at least at the maximum power the wireless device is rated to transmit. At optional step 618, the wireless device transmitting a second reference signal corresponding to a second antenna port using a power amplifier capable of transmitting less than maximum power the wireless device is rated to transmit. The second antenna port is different from the antenna port shared by the precoders associated with the second power scaling value.

Modifications, additions, or omissions may be made to method 600 of FIG. 6. Additionally, one or more steps in the method of FIG. 6 may be performed in parallel or in any suitable order.

Figure 7:
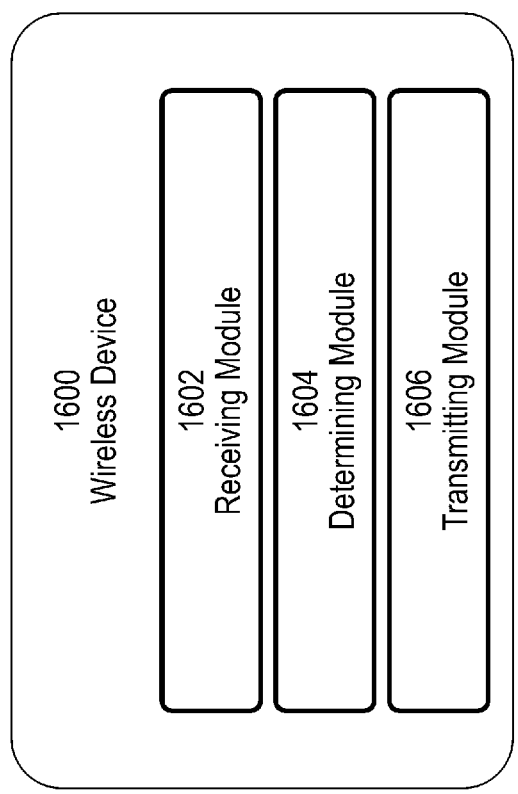
FIG. 7 illustrates a schematic block diagram of a wireless device in a wireless network, according to certain embodiments.

FIG. 7 illustrates a schematic block diagram of an apparatus in a wireless network (for example, the wireless network illustrated in FIG. 3). The apparatus may comprise a wireless device (e.g., wireless device 110 in FIG. 3). Apparatus 1600 is operable to carry out the example methods described with reference to FIGS. 5 and 6. Apparatus 1600 may be operable to carry out other processes or methods disclosed herein. It is also to be understood that the methods of FIGS. 5 and 6 are not necessarily carried out solely by apparatus 1600. At least some operations of the method can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure.

As illustrated in FIG. 7, apparatus 1600 includes receiving module 1602 configured to receive configuration information for an uplink transmission, such as an indication of a precoder to be used to transmit a physical uplink channel, according to any of the embodiments and examples described herein. Determining module 1604 is configured to determine transmission power capabilities, according to any of the embodiments and examples described herein. Apparatus 1600 also includes transmitting module 1606 configured to signal transmission power capabilities to a network node and transmit uplink channels based on the transmission power capabilities, according to any of the embodiments and examples described herein.

Figure 8:
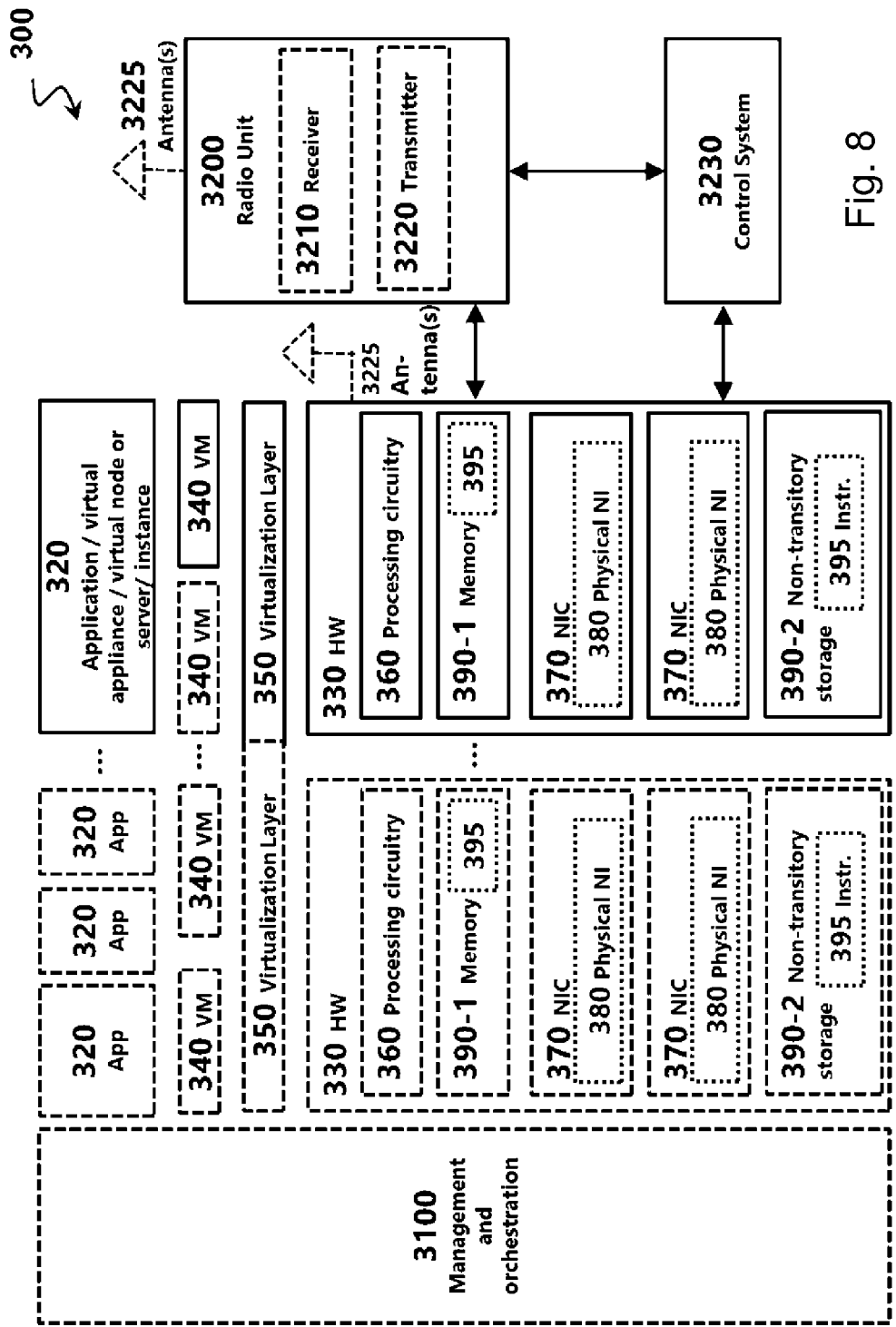
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 9:
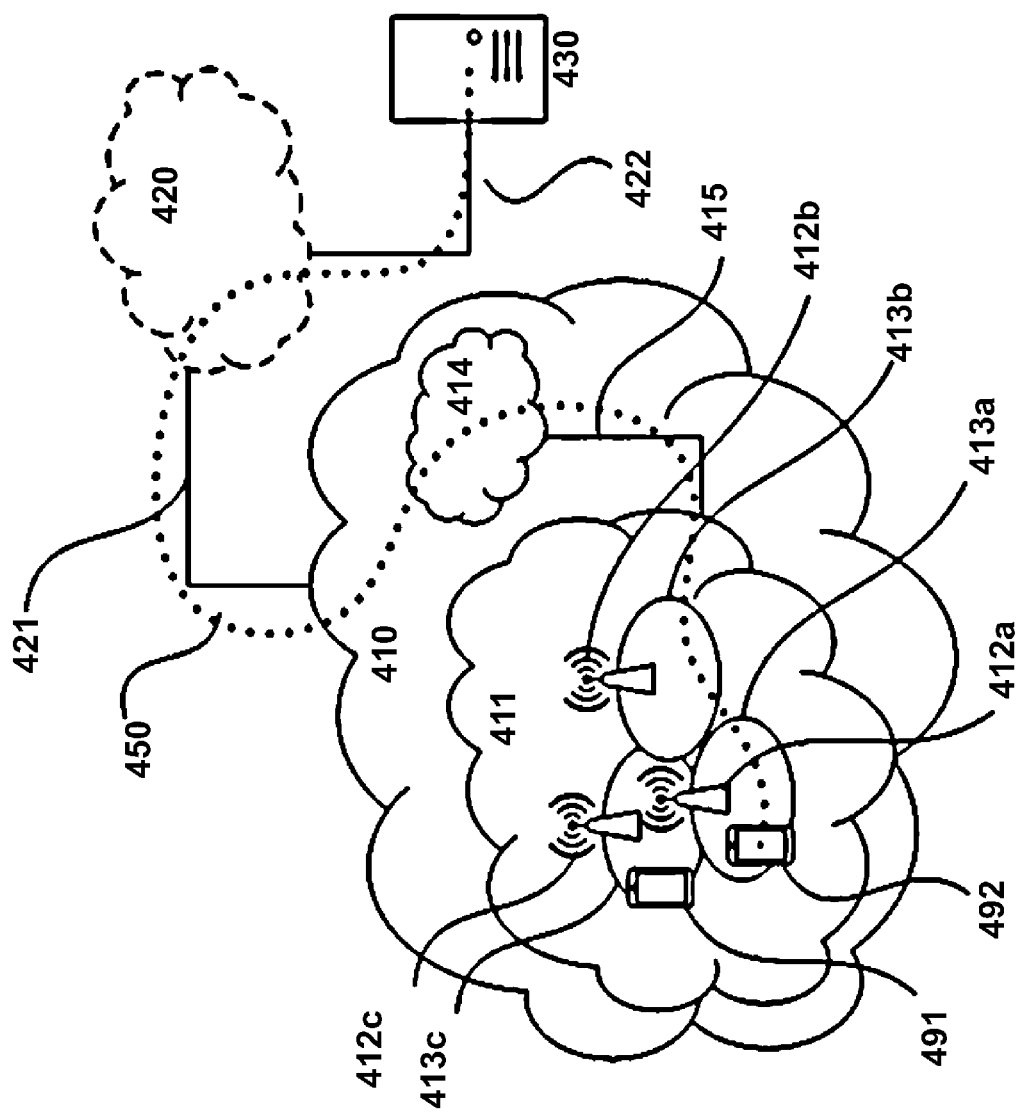
FIG. 9 illustrates an example telecommunication network connected via an intermediate network to a host computer, according to certain embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
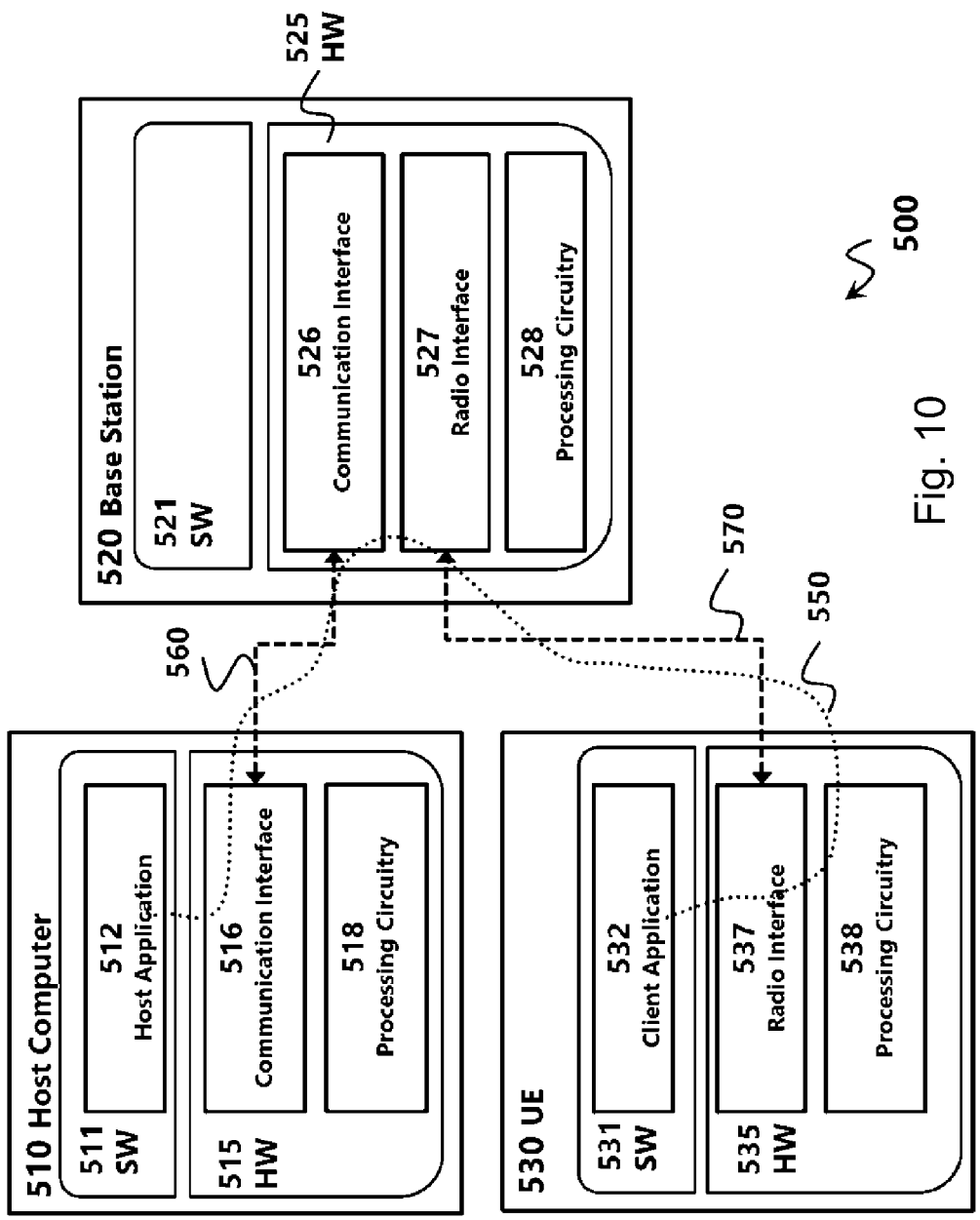
FIG. 10 illustrates an example host computer communicating via a base station with a user equipment over a partially wireless connection, according to certain embodiments.

FIG. 10 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct, or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412*a*, 412*b*, 412*c* and one of UEs 491, 492 of FIG. 3, respectively. This is to say, the inner workings of these entities may be as shown in FIG. 10 and independently, the surrounding network topology may be that of FIG. 3.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
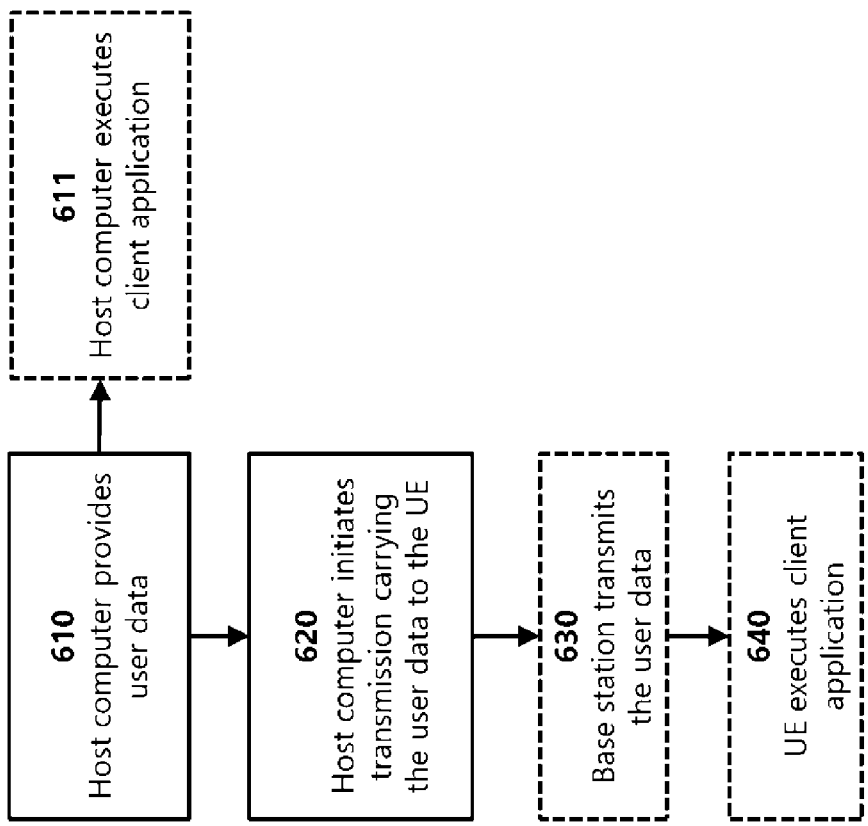
FIG. 11 is a flowchart illustrating a method implemented, according to certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
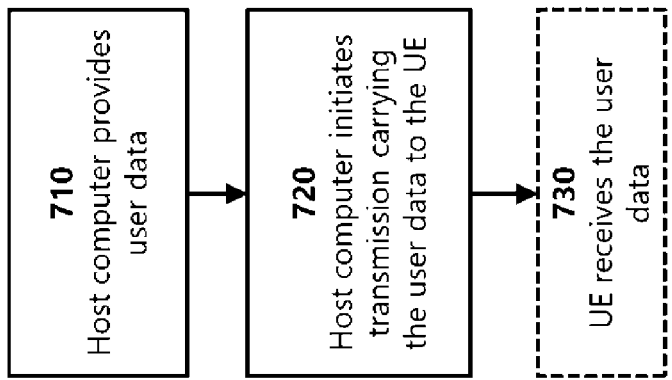
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
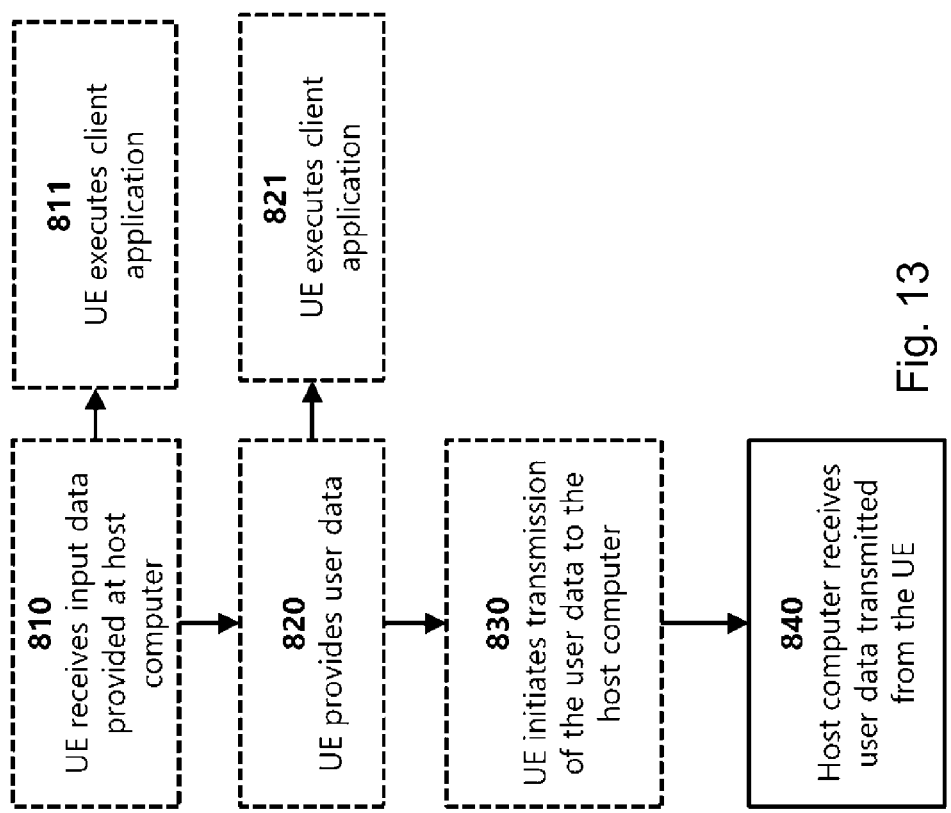
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
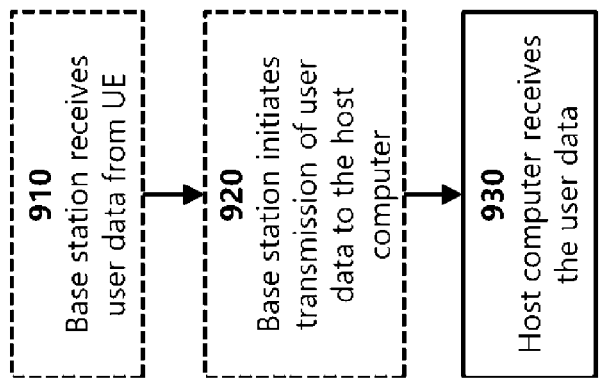
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GEO Geostationary Orbit
GERAN GSM EDGE Radio Access Network
gNB Base station in NR
GNSS Global Navigation Satellite System
GPS Global Positioning System
GSM Global System for Mobile communication
HARQ Hybrid Automatic Repeat Request
HO Handover
HSPA High Speed Packet Access
HRPD High Rate Packet Data
LEO Low Earth Orbit
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MEO Medium Earth Orbit
MIB Master Information Block
MIMO Multiple-Input Multiple-Output
MME Mobility Management Entity
MSC Mobile Switching Center
NGSO Non-Geostationary Orbit
NPDCCH Narrowband Physical Downlink Control Channel
NR New Radio
NTN Non-Terrestrial Networks
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PA Power Amplifier
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RA Random Access
RACH Random Access Channel
QAM Quadrature Amplitude Modulation
RAN Radio Access Network
RAT Radio Access Technology RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SRI SRS resource indicator
SRS Sounding Reference Signal
SS Synchronization Signal
SSS Secondary Synchronization Signal
TDD Time Division Duplex
TDOA Time Difference of Arrival
TFRE Time Frequency Resource Element
TOA Time of Arrival
TPC Transmit Power Control
TPMI Transmit Precoder Matrix Indicator
TRI Transmission Rank Indicator
TRP Transmit Reception Point
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for transmitting on a plurality of antennas, the method comprising:
signaling, to a network node, a wireless device power transmission capability, wherein the wireless device power transmission capability identifies a power ratio value of a plurality of power ratio values that the wireless device supports for transmission of a physical uplink channel for each antenna port of a number of antenna ports supported by the wireless device and wherein a power ratio refers to a ratio relative to a maximum power the wireless device is rated to transmit; and
transmitting a physical uplink channel using the number of antenna ports with a power scaled at least by the power ratio value.

2. The method of claim 1, further comprising scaling a transmission power for the physical uplink channel based on the number of antenna ports associated with the power ratio value.

3. The method of claim 2, wherein the scaling is limited so that the scaled transmission power does not exceed the maximum value the wireless device is rated to transmit.

4. The method of claim 3, wherein the scaling is by a factor $$\delta(k) = \min\left(1, \frac{N_{nz} \cdot \Delta(k)}{N_{srs}}\right),$$

wherein $\Delta(k)$ is a power ratio value and a real positive real number, $N_{nz}$ is a number of antenna ports with non-zero transmission power used to transmit the physical uplink channel, and $N_{SRS}$ is a number of antenna ports and a number of sounding reference signal (SRS) ports in an SRS resource with index k configured to the wireless device.

5. The method of claim 1, wherein the transmission power capability identifies a plurality of power ratio values, each associated with a number of physical uplink channel layers, a precoder to be used to transmit the physical uplink channel, and the number of antenna ports.

6. The method of claim 1, wherein the transmission power capability identifies a plurality of power ratio values, each associated with a different number of antenna ports.

7. The method of claim 1, wherein the transmission power capability corresponds to a codebook subset, the subset identified as containing at least one of fully and partial and non-coherent precoders, partial and non-coherent precoders, and non-coherent precoders.

8. The method of claim 1, wherein the transmission power capability further comprises a second power ratio of the plurality of power ratio values and a precoder that the wireless device may use for physical uplink channel transmission with the power scaled by the second power ratio and with the number of antenna ports.

9. A wireless device capable of transmitting on a plurality of antennas, the wireless device comprising processing circuitry operable to:
signal, to a network node, a wireless device power transmission capability, wherein the wireless device power transmission capability identifies a power ratio value of a plurality of power ratio values that the wireless device supports for transmission of a physical uplink channel for each antenna port of a number of antenna ports supported by the wireless device and wherein a power ratio refers to a ratio relative to a maximum power the wireless device is rated to transmit; and
transmit a physical uplink channel using the number of antenna ports with a power scaled at least by the power ratio value.

10. The wireless device of claim 9, the processing circuitry further operable to scale a transmission power for the physical uplink channel based on the number of antenna ports associated with the power ratio value.

11. The wireless device of claim 10, wherein the scaling is limited so that the scaled transmission power does not exceed the maximum value the wireless device is rated to transmit.

12. The wireless device of claim 11, wherein the scaling is by a factor $$\delta(k) = \min\left(1, \frac{N_{nz} \cdot \Delta(k)}{N_{srs}}\right),$$

wherein Δ(k) is a power ratio value and a real positive real number, $N_{nz}$ is a number of antenna ports with non-zero transmission power used to transmit the physical uplink channel, and $N_{SRS}$ is a number of antenna ports and a number of sounding reference signal (SRS) ports in an SRS resource with index k configured to the wireless device.

13. The wireless device of claim 9, wherein the transmission power capability identifies a plurality of power ratio values, each associated with a number of physical uplink channel layers, a precoder to be used to transmit the physical uplink channel, and the number of antenna ports.

14. The wireless device of claim 9, wherein the transmission power capability identifies a plurality of power ratio values, each associated with a different number of antenna ports.

15. The wireless device of claim 9, wherein the transmission power capability corresponds to a codebook subset, the subset identified as containing at least one of fully and partial and non-coherent precoders, partial and non-coherent precoders, and non-coherent precoders.

16. The wireless device of claim 9, wherein the transmission power capability further comprises a second power ratio of the plurality of power ratio values and a precoder that the wireless device may use for physical uplink channel transmission with the power scaled by the second power ratio and with the number of antenna ports.

17. A method performed by a wireless device for transmitting on a plurality of antennas, the method comprising:
receiving an indication of a precoder to be used to transmit a physical uplink channel, wherein the precoder is one precoder of a set of precoders, each precoder in the set of precoders is a matrix or vector comprising an equal number of non-zero elements, a first precoder in the set of precoders is able to be associated with a first power scaling value or a second power scaling value, and a second precoder in the set of precoders is only able to be associated with the second power scaling value; and
transmitting a layer i of an L layer physical uplink channel at a power $P_i$ according to the first or second power scaling value associated with the precoder.

18. The method of claim 17, wherein:
the first power scaling value is $P_i=P/L$, where P is the total power to be used for physical uplink channel transmission, and
the second power scaling value is $P_i=PR/L$, where R=M/K, M is a number of antenna ports with non-zero physical uplink channel transmission, and K is one of:
a maximum number of physical uplink channel layers supported by the wireless device,
a number of antenna ports used in a codebook configured for the wireless device,
a maximum rank configured to the wireless device, and
a number of sounding reference signal (SRS) ports configured to the wireless device for one or both of codebook and non-codebook based operation.

19. The method of claim 17, wherein each precoder in the set of precoders associated with the second power scaling value contains a non-zero magnitude element corresponding to an antenna port shared by the precoders associated with the second power scaling value.

20. The method of claim 19, further comprising:
transmitting a first reference signal corresponding to the antenna port shared by the precoders associated with the second power scaling value using a power amplifier capable of transmitting at least at the maximum power the wireless device is rated to transmit, and
transmitting a second reference signal corresponding to a second antenna port using a power amplifier capable of transmitting less than maximum power the wireless device is rated to transmit, wherein the second antenna port is different from the antenna port shared by the precoders associated with the second power scaling value.

21. A wireless device capable of transmitting on a plurality of antennas, the wireless device comprising processing circuitry operable to:
receive an indication of a precoder to be used to transmit a physical uplink channel, wherein the precoder is one precoder of a set of precoders, each precoder in the set of precoders is a matrix or vector comprising an equal number of non-zero elements, a first precoder in the set of precoders is able to be associated with a first power scaling value or a second power scaling value, and a second precoder in the set of precoders is only able to be associated with the second power scaling value; and
transmit a layer i of an L layer physical uplink channel at a power $P_i$ according to the first or second power scaling value associated with the precoder.

22. The wireless device of claim 21, wherein:
the first power scaling value is $P_i=P/L$, where P is the total power to be used for physical uplink channel transmission, and
the second power scaling value is $P_i=PR/L$, where R=M/K, M is a number of antenna ports with non-zero physical uplink channel transmission, and K is one of:
a maximum number of physical uplink channel layers supported by the wireless device,
a number of antenna ports used in a codebook configured for the wireless device,
a maximum rank configured to the wireless device, and
a number of sounding reference signal (SRS) ports configured to the wireless device for one or both of codebook and non-codebook based operation.

23. The wireless device of claim 21, wherein each precoder in the set of precoders associated with the second power scaling value contains a non-zero magnitude element corresponding to an antenna port shared by the precoders associated with the second power scaling value.

24. The wireless device of claim 23, the processing circuitry further operable to:
transmit a first reference signal corresponding to the antenna port shared by the precoders associated with the second power scaling value using a power amplifier capable of transmitting at least at the maximum power the wireless device is rated to transmit, and
transmit a second reference signal corresponding to a second antenna port using a power amplifier capable of transmitting less than maximum power the wireless device is rated to transmit, wherein the second antenna port is different from the antenna port shared by the precoders associated with the second power scaling value.

* * * * *

UNITED STATES PATENT AND TRADEMARK OFFICE
CERTIFICATE OF CORRECTION

PATENT NO. : 11,228,984 B2  
APPLICATION NO. : 17/114741  
DATED : January 18, 2022  
INVENTOR(S) : Harrison et al.

Page 1 of 5

It is certified that error appears in the above-identified patent and that said Letters Patent is hereby corrected as shown below:

In the Drawings

In Fig. 4, Sheet 4 of 12, for Tag "201", in Line 1, delete "Processor" and insert -- Processing Circuitry --, therefor.

In the Specification

In Column 1, Lines 6-7, delete "35 U.S.C. 111(a) of co-pending International" and insert -- 35 U.S.C. § 111(a) of International --, therefor.

In Column 2, Line 46, delete "$|h_1+eh_2|=2|h_1|^2-2Re(h_1*eh_2)+|eh_2|^2$." and insert -- $|h_1+eh_2|^2=|h_1|^2-2Re(h_1*eh_2)+|eh_2|^2$. --, therefor.

In Column 2, Lines 46-47, delete "$2Re(h_1*eh_2)=|h_1|^2\alpha|h_2|^2$," and insert -- $2Re(h_1*eh_2)=|h_1|^2+|h_2|^2$, --, therefor.

In Column 3, Line 24, delete "vectors is" and insert -- vector s is --, therefor.

In Column 3, Line 37, delete "time/frequency resource element (TFRE)." and insert -- time frequency resource element (TFRE). --, therefor.

In Column 4, Lines 5-6, delete "transmit reception point (TRP)" and insert -- transmission reception point (TRP) --, therefor.

In Column 4, Line 17, delete "indicator (TRIs)." and insert -- indicators (TRIs). --, therefor.

In Column 4, Lines 17-18, delete "modulation and coding state (MCS)," and insert -- modulation and coding scheme (MCS), --, therefor.

In Column 4, Line 33, delete "SRS resource indication (SRI)" and insert -- SRS resource indicator Signed and Sealed this  
Second Day of August, 2022

Katherine Kelly Vidal  
*Director of the United States Patent and Trademark Office*

(SRI) --, therefor.

In Column 4, Line 38, delete "SRS-AssocCSIRS" and insert -- SRS-AssocCSI-RS --, therefor.

In Column 4, Line 39, delete "ulTxConfig" and insert -- ULTxConfig --, therefor.

In Column 5, Lines 47-48, delete "orthogonal frequency division multiplexed (OFDM)" and insert -- orthogonal frequency division multiplexing (OFDM) --, therefor.

In Column 5, Line 50, delete "adjacent" and insert -- adjacent to --, therefor.

In Column 5, Lines 64-65, delete "in to" and insert -- into --, therefor.

In Column 6, Lines 33-34, delete "configured N SRS" and insert -- configured with $N_{SRS}$ --, therefor.

In Column 7, in Table 1, Lines 8-9, delete "'fullyAndPartialAndNon Coherent'" and insert -- 'fullyAndPartialAndNonCoherent' --, therefor.

In Column 7, Lines 25-26, delete "per band per band combination" and insert -- per band combination --, therefor.

In Column 7, Lines 53-54, delete "user equipment (UEs)" and insert -- user equipments (UEs) --, therefor.

In Column 9, Lines 30-31, delete "at least at the maximum" and insert -- at least the maximum --, therefor.

In Column 10, Line 7, delete "is flowchart" and insert -- is a flowchart --, therefor.

In Column 10, Line 41, delete "user equipment (UEs)" and insert -- user equipments (UEs) --, therefor.

In Column 14, Lines 34-35, delete "$\Delta(k)=1/4 \cdot \{1,2,4\}=(1/4,1/2,1)$" and insert -- $\Delta(k)=1/4 \cdot \{1,2,4\}=\{1/4,1/2,1\}$ --, therefor.

In Column 14, Line 43, delete "$\Delta=\{1/4, 1/2, 1, 2, 4\}.$" and insert -- $\Delta(k)=\{1/4, 1/2, 1, 2, 4\}.$ --, therefor.

In Column 16, Line 27, delete "for S" and insert -- for $\delta$ --, therefor.

In Column 17, Line 57, delete "the 13" and insert -- the 1/3 --, therefor.

In Column 20, in Table 12, under "4 Ports" Line 4, delete "TPM$_2$," and insert -- TPMI$_2$, --, therefor.

In Column 21, under Table 14, Lines 20-27, delete

" [Additional TPMI sets for a partial coherent UE, 4 Ports:
$P_3(4, 2) = \{TPMI_6, TPMI_7, TPMI_8, TPMI_9, TPMI_{10}, TPMI_{11}, TPMI_{12}, TPMI_{13}\}$
$P_3(4, 3) = \{TPMI_1, TPMI_2\}$
$P_3(4, 4) = \{TPMI_1, TPMI_2\}$] " and insert -- [Additional TPMI sets for a partial coherent UE, 4 Ports:
$P_3(4, 2) = \{TPMI_6, TPMI_7, TPMI_8, TPMI_9, TPMI_{10}, TPMI_{11}, TPMI_{12}, TPMI_{13}\}$
$P_3(4, 3) = \{TPMI_1, TPMI_2\}$
$P_3(4, 4) = \{TPMI_1, TPMI_2\}$] --, therefor.

In Column 21, Line 57, delete "signalling (k)" and insert -- signalling Δ(k) --, therefor.

In Column 22, Line 23, delete "dependent power scaling." and insert -- dependent on power scaling value. --, therefor.

In Column 22, Line 55, delete "according Table" and insert -- according to Table --, therefor.

In Column 22, Line 61, delete "pusch-TransCoherence" and insert -- PUSCH-TransCoherence --, therefor.

In Column 24, Line 43, delete "NodeB's." and insert -- NodeBs. --, therefor.

In Column 25, Line 20, delete "(SOC)." and insert -- (SoC). --, therefor.

In Column 25, Line 30, delete "units" and insert -- units. --, therefor.

In Column 26, Line 56, delete "be separate" and insert -- be separated --, therefor.

In Column 27, Line 55, delete "a wireless cameras," and insert -- a wireless camera, --, therefor.

In Column 27, Line 61, delete "(CPE). a" and insert -- (CPE), a --, therefor.

In Column 28, Line 9, delete "narrow band internet of things (NB-IoT)" and insert -- Narrowband Internet of Things (NB-IoT) --, therefor.

In Column 28, Line 36, delete "be separate" and insert -- be separated --, therefor.

In Column 29, Line 24, delete "SOC." and insert -- SoC. --, therefor.

In Column 30, Lines 10-11, delete "Read Only Memory" and insert -- Read-Only Memory --, therefor.

In Column 31, Lines 51-52, delete "interchangeable." and insert -- interchangeably. --, therefor.

CERTIFICATE OF CORRECTION (continued)
U.S. Pat. No. 11,228,984 B2

In Column 33, Line 24, delete "(RAID)," and insert -- (RAIDs), --, therefor.

In Column 33, Lines 32-33, delete "removable user identity (SIM/RUIM) module," and insert -- removable user identity module (SIM/RUIM), --, therefor.

In Column 36, Line 21, delete "at least at the maximum" and insert -- at least the maximum --, therefor.

In Column 36, Line 62, delete "according one" and insert -- according to one --, therefor.

In Column 38, Line 38, delete "(VNE)." and insert -- (VNEs). --, therefor.

In Column 38, Line 43, delete "FIG. 18." and insert -- FIG. 8. --, therefor.

In Column 40, Line 55, delete "of FIG. 3," and insert -- of FIG. 9, --, therefor.

In Column 42, Line 39, delete "FIG. 13," and insert -- FIG. 14, --, therefor.

In Column 43, Line 49, delete "CDMA Code Division Multiplexing Access" and insert -- CDMA Code Division Multiple Access --, therefor.

In Column 43, Line 56, delete "band" and insert the same at Line 55, after "the" as a continuation point.

In Column 43, Line 57, delete "CQI Channel Quality information" and insert -- CQI Channel Quality Indicator --, therefor.

In Column 44, Line 2, delete "E-SMLC Evolved-Serving Mobile Location Centre".

In Column 44, Line 6, delete "E-SMLC evolved Serving Mobile Location Center" and insert -- E-SMLC Enhanced Serving Mobile Location Center --, therefor.

In Column 44, Line 25, delete "MBMS" and insert -- MBMSs --, therefor.

In Column 44, Line 29, delete "MDT" and insert -- MDTs --, therefor.

In Column 44, Line 39, delete "NTN" and insert -- NTNs --, therefor.

In Column 45, Line 35, delete "TRP Transmit Reception Point" and insert -- TRP Transmission Reception Point --, therefor.

In Column 45, Line 45, delete "WCDMA Wide CDMA" and insert -- WCDMA Wideband CDMA --, therefor.

CERTIFICATE OF CORRECTION (continued)
U.S. Pat. No. 11,228,984 B2

In Column 45, Line 46, delete "WLAN Wide Local Area Network" and insert -- WLAN Wireless Local Area Network --, therefor.

In the Claims

In Column 46, Lines 27-28, in Claim 7, delete "subset identified" and insert -- subset is identified --, therefor.

In Column 46, Line 52, in Claim 10, delete "claim 9, the" and insert -- claim 9, wherein the --, therefor.

In Column 47, Line 19, in Claim 15, delete "subset identified" and insert -- subset is identified --, therefor.

In Column 48, Line 5, in Claim 20, delete "at least at the maximum" and insert -- at least the maximum --, therefor.

In Column 48, Line 53, in Claim 24, delete "at least at the maximum" and insert -- at least the maximum --, therefor.